United States Patent [19]

Huseby et al.

[11] Patent Number: 4,578,365

[45] Date of Patent: Mar. 25, 1986

[54] HIGH THERMAL CONDUCTIVITY CERAMIC BODY OF ALUMINUM NITRIDE

[75] Inventors: Irvin C. Huseby, Schenectady; Carl F. Bobik, Burnt Hills, both of N.Y.

[73] Assignee: General Electric Company, Schenectady, N.Y.

[21] Appl. No.: 728,117

[22] Filed: Apr. 29, 1985

Related U.S. Application Data

[63] Continuation-in-part of Ser. No. 675,048, Nov. 26, 1984, abandoned.

[51] Int. Cl.$^4$ .......................... C04B 35/58; F27D 7/06
[52] U.S. Cl. ........................................ 501/98; 264/61; 264/63; 264/65; 264/66; 501/96; 501/152
[58] Field of Search ............... 264/65, 63, 61, 66; 501/96, 98, 152, 153

[56] References Cited

U.S. PATENT DOCUMENTS

| | | | |
|---|---|---|---|
| 3,108,887 | 8/1963 | Lenie et al. | 501/98 |
| 3,833,389 | 9/1974 | Komeya et al. | 501/96 |
| 3,930,875 | 1/1976 | Ochiai et al. | 501/98 |
| 4,097,293 | 6/1978 | Komeya et al. | 501/98 |
| 4,203,733 | 5/1980 | Tanaka et al. | 51/295 |
| 4,435,513 | 3/1984 | Komeya et al. | 501/96 |
| 4,478,785 | 10/1984 | Huseby et al. | 264/65 |
| 4,519,966 | 5/1985 | Aldinger et al. | 501/96 |
| 4,533,645 | 8/1985 | Huseby et al. | 501/96 |
| 4,540,673 | 9/1985 | Takeda et al. | 501/96 |

FOREIGN PATENT DOCUMENTS

| | | | |
|---|---|---|---|
| 3313836 | 10/1984 | Fed. Rep. of Germany. | |
| 48-32110 | 4/1973 | Japan | 501/92 |
| 49-19686 | 3/1974 | Japan. | |
| 54-12488 | 5/1979 | Japan | 501/97 |
| 59-207882 | 11/1984 | Japan | 501/96 |
| 2132911 | 7/1984 | United Kingdom. | |

OTHER PUBLICATIONS

Werdecker, W. et al. "Aluminum Nitride—An Alternative Ceramic Substrate for High Power Applications in Micro Circuits", IEEE, May 1984 pp. 402–406.

Shinozaki, K. et al., "Sintering Behavior and Thermal Characteristics of Pressureless Sintered AlN with $Y_2O_3$ Addition," 22nd Symposium on Basic Science of Ceramics, Yogyo-Kyokai, Jan. 1984, p. 43.

Ceramic Bulletin (American Ceramic Society), vol. 63, No. 8 (1984) p. 1009.

Heraeus PS-B-80 4 pages.

Komeya, "Effects of Various Additives on Sintering of Aluminum Nitride", Yogyo-Kyokai-shi, 89(6) 1981, pp. 58–64.

"Science of Ceramics", vol. 6, 1973, pp. XX/3-XX13.

Komeya et al., Trans. & J. Brit. Ceram. Soc., 70 (3), pp. 107–113 (1971) "The Influence of Fibrous Aluminum Nitride on the Strength of Sintered $AlN-Y_2O_3$".

Advanced Optical Ceramics, Phase III, Final Report, DIN:82SDR2006, Feb. 1982, pp. 4–68 to 4–80 and 4–127 to 4–137.

(List continued on next page.)

*Primary Examiner*—Helen M. McCarthy
*Attorney, Agent, or Firm*—Jane M. Binkowski; James C. Davis, Jr.; James Magee, Jr.

[57] ABSTRACT

Figure 4:
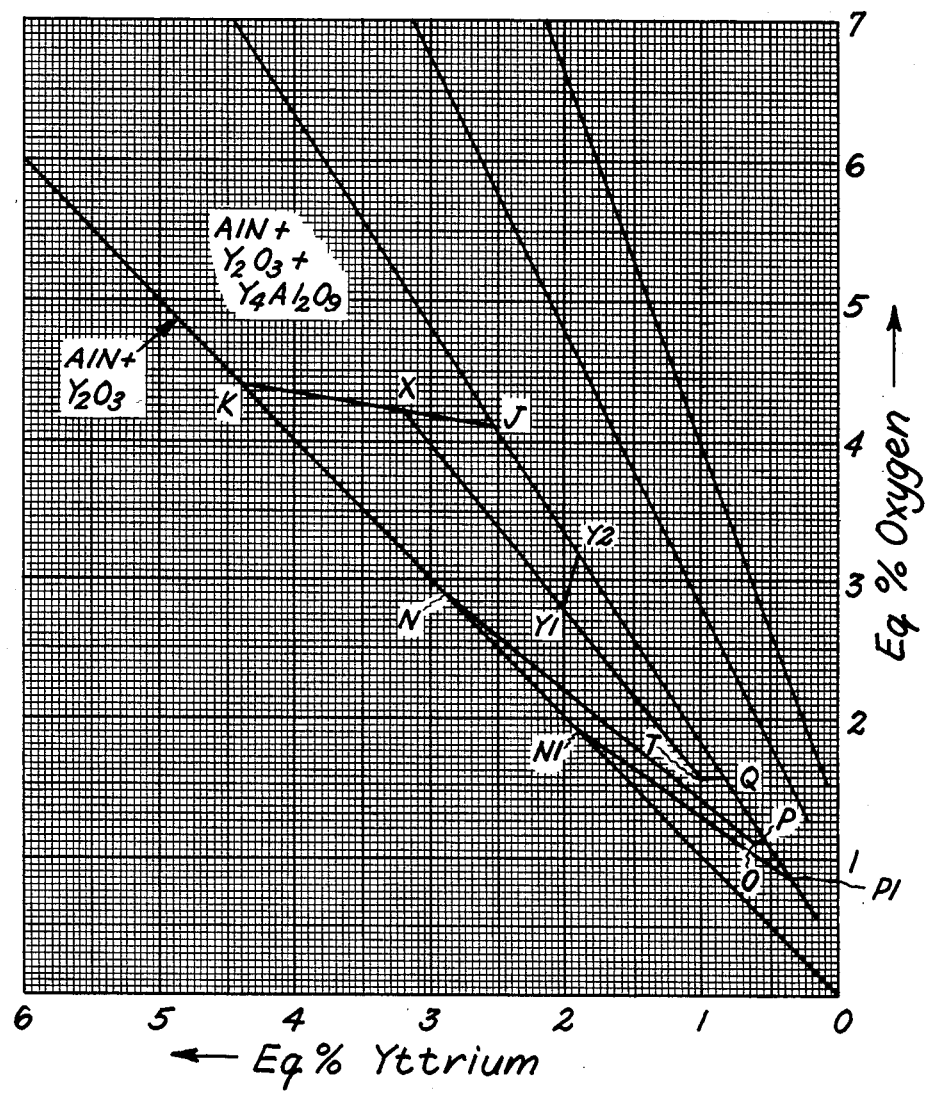

A process for producing an aluminum nitride ceramic body having a composition defined and encompassed by polygon P1N1KJ but not including lines KJ and P1J of FIG. 4, and a thermal conductivity greater than 1.00 W/cm·K at 25° C. which comprises forming a mixture comprised of aluminum nitride powder containing oxygen, yttrium oxide, and free carbon, shaping said mixture into a compact, said mixture and said compact having a composition wherein the equivalent % of yttrium and aluminum ranges between points K and P1 of FIG. 4, said compact having an equivalent % composition of Y, Al, O and N outside the composition defined and encompassed by polygon P1N1KJ of FIG. 4, heating said compact up to a temperature at which its pores remain open reacting said free carbon with oxygen contained in said aluminum nitride producing a deoxidized compact, said deoxidized compact having a composition wherein the equivalent % of Al, Y, O and N is defined and encompassed by polygon P1N1KJ but not including lines KJ and P1J of FIG. 4, and sintering said deoxidized compact at a temperature of at least about 1860° C. producing said ceramic body.

46 Claims, 4 Drawing Figures

OTHER PUBLICATIONS

Slack, G. A. "Nonmetallic Crystals with High Thermal Conductivity", J. Phys. Chem. Solids, 1973, vol. 34, pp. 321–335.

Litvinenko, V. F. et al. "Thermophysical Properties of Aluminum Nitride–Yttria Materials", translated from Poroshkovaya Metallurgiya, No. 6(246), pp. 77–79, Jun., 1983, pp. 490–492.

Schwetz, K. A. et al. "Sintering of Aluminum Nitride with Low Oxide Addition", Progress in Nitrogen Ceramics (1983) pp. 245–252.

Iwase, N. et al. "Development of a High Thermal Conductive AlN Ceramic Substrate Technology", The International Journal for Hybrid Microelectronics, vol. 7, #4, Dec. 1984.

HIGH THERMAL CONDUCTIVITY CERAMIC BODY OF ALUMINUM NITRIDE

This application is a continuation-in-part of copending application Ser. No. 675,048 filed on Nov. 26, 1984 in the names of Irvin Charles Huseby and Carl Francis Bobik, now abandoned.

The present invention relates to the production of a liquid phase sintered polycrystalline aluminum nitride body having a thermal conductivity higher than 1.00 W/cm·K at 25° C., and preferably at least about 1.50 W/cm·K at 25° C. In one aspect of the present process, aluminum nitride is deoxidized by carbon to a certain extent, and then it is further deoxidized and/or sintered by utilizing yttrium oxide to produce the present ceramic.

A suitably pure aluminum nitride single crystal, containing 300 ppm dissolved oxygen, has been measured to have a room temperature thermal conductivity of 2.8 W/cm·K, which is almost as high as that of BeO single crystal, which is 3.7 W/cm·K, and much higher than that of $\alpha$-$Al_2O_3$ single crystal, which is 0.44 W/cm·K. The thermal conductivity of an aluminum nitride single crystal is a strong function of dissolved oxygen and decreases with an increase in dissolved oxygen content. For example, the thermal conductivity of aluminum nitride single crystal having 0.8 wt % dissolved oxygen, is about 0.8 W/cm·K.

Aluminum nitride powder has an affinity for oxygen, especially when its surface is not covered by an oxide. The introduction of oxygen into the aluminum nitride lattice in aluminum nitride powder results in the formation of Al vacancies via the equation:

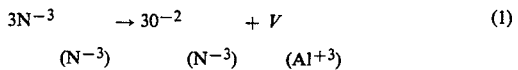

$$3N^{-3} \rightarrow 3O^{-2} + V \quad (1)$$
$$(N^{-3}) \quad (N^{-3}) \quad (Al^{+3})$$

Thus, the insertion of 3 oxygen atoms on 3 nitrogen sites will form one vacancy on an aluminum site. The presence of oxygen atoms on nitrogen sites will probably have a negligible influence on the thermal conductivity of AlN. However, due to the large difference in mass between an aluminum atom and a vacancy, the presence of vacancies on aluminum sites has a strong influence on the thermal conductivity of AlN and, for all practical purposes, is probably responsible for all of the decrease in the thermal conductivity of AlN.

There are usually three different sources of oxygen in nominally pure AlN powder. Source #1 is discrete particles of $Al_2O_3$. Source #2 is an oxide coating, perhaps as $Al_2O_3$, coating the AlN powder particles. Source #3 is oxygen in solution in the AlN lattice. The amount of oxygen present in the AlN lattice in AlN powder will depend on the method of preparing the AlN powder. Additional oxygen can be introduced into the AlN lattice by heating the AlN powder at elevated temperatures. Measurements indicate that at ~1900° C. the AlN lattice can dissolve ~1.2 wt % oxygen. In the present invention, by oxygen content of AlN powder, it is meant to include oxygen present as sources #1, #2 and #3. Also, in the present invention, the oxygen present with AlN powder as sources #1, #2 and #3 can be removed by utilizing free carbon, and the extent of the removal of oxygen by carbon depends largely on the composition desired in the resulting sintered body.

According to the present invention, aluminum nitride powder can be processed in air and still produce a ceramic body having a thermal conductivity greater than 1.00 W/cm·K at 25° C., and preferably at least about 1.50 W/cm·K at 25° C.

In one embodiment of the present invention, the aluminum nitride in a compact comprised of particulate aluminum nitride of known oxygen content, free carbon and yttrium oxide, is deoxidized by carbon to produce a desired equivalent composition of Al, N, Y and O, and the deoxidized compact is sintered by means of a liquid phase containing mostly Y and O and a smaller amount of Al and N.

Figure 1:
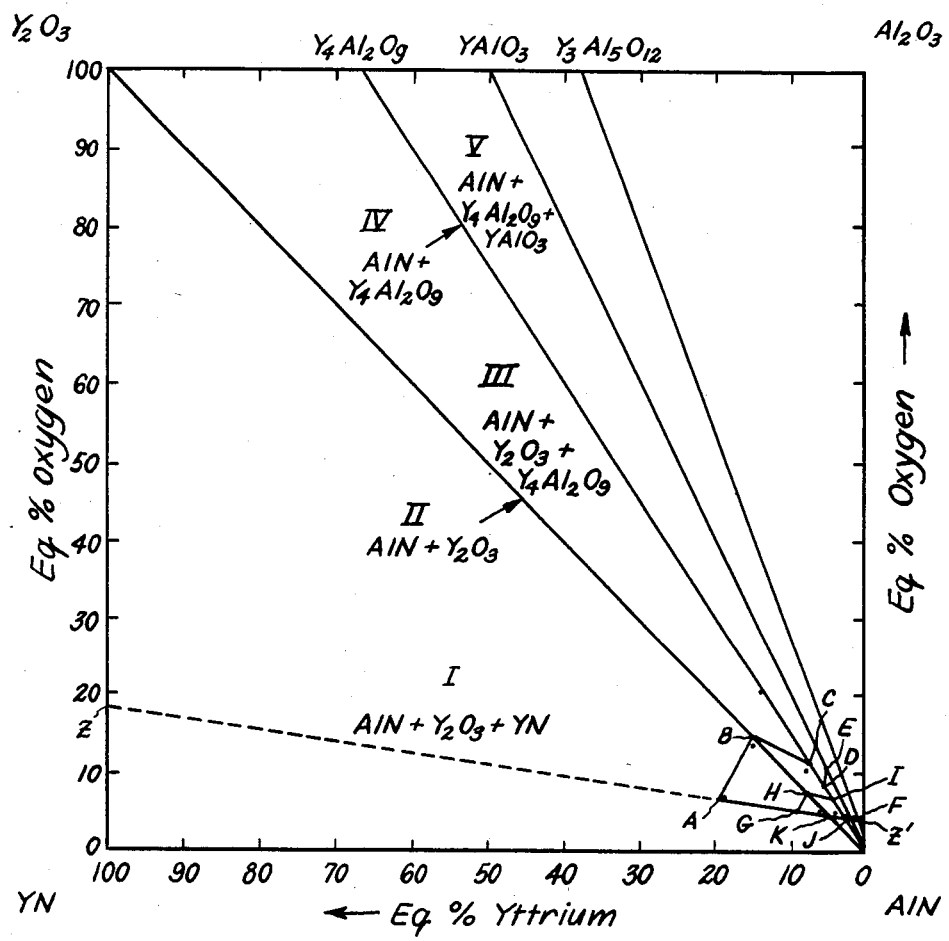
Figure 2:
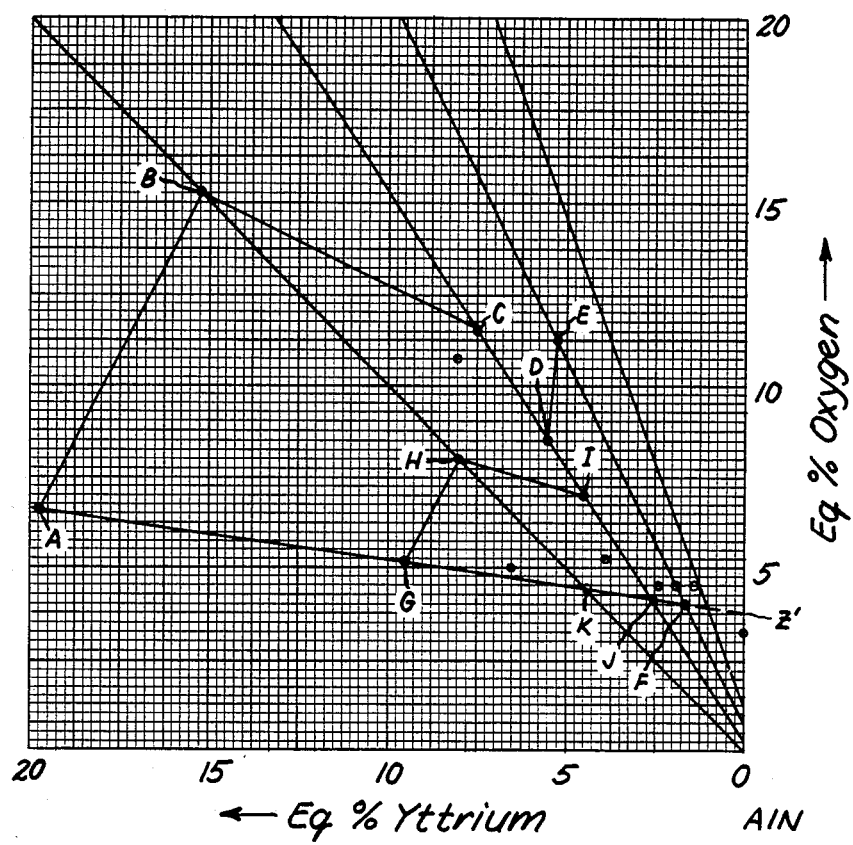
Figure 3:
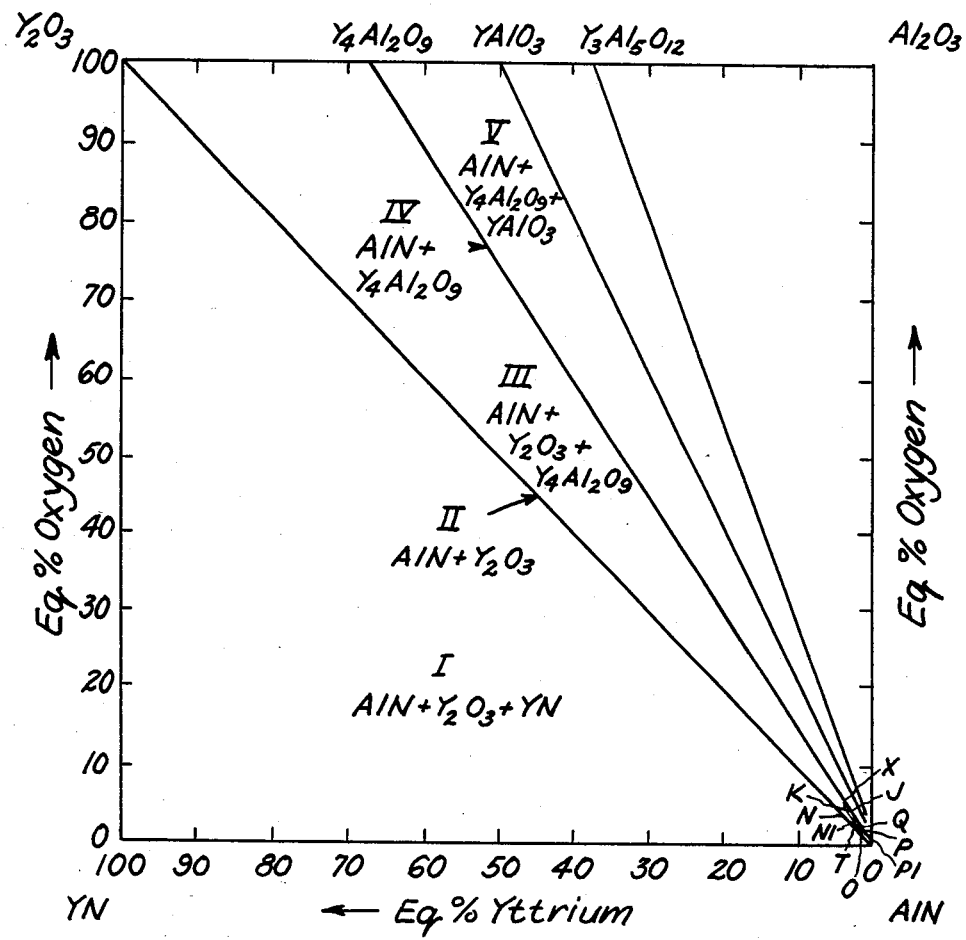

Those skilled in the art will gain a further and better understanding of the present invention from the detailed description set forth below, considered in conjunction with the figures accompanying and forming a part of the specification in which:

FIG. 1 is a composition diagram (also shown as FIG. 1 in U.S. Pat. No. 4,547,471, copending Ser. No. 553,213, filed on Nov. 18, 1983) showing the subsolidus phase equilibria in the reciprocal ternary system comprised of AlN, YN, $Y_2O_3$ and $Al_2O_3$. FIG. 1 is plotted in equivalent % and along each axis of ordinates the equivalent % of oxygen is shown (the equivalent % of nitrogen is 100% minus the equivalent % of oxygen). Along the axis of abscissas, the equivalent % of yttrium is shown (the equivalent % of aluminum is 100% minus the equivalent % of yttrium). In FIG. 1, line ABCDEF but not lines CD and EF encompasses and defines the composition of the sintered body of Ser. No. 553,213. FIG. 1 also shows an example of an ordinates-joining straight line ZZ' joining the oxygen contents of an YN additive and an aluminum nitride powder. From the given equivalent % of yttrium and Al at any point on an ordinates-joining line passing through the polygon ABCDEF, the required amounts of yttrium additive and AlN for producing the composition of that point on the ordinates-joining line can be calculated;

FIG. 2 is an enlarged view of the section of FIG. 1 showing the composition of the polycrystalline body of Ser. No. 553,213;

FIG. 3 is a composition diagram showing the subsolidus phase equilibria in the reciprocal ternary system comprised of AlN, YN, $Y_2O_3$ and $Al_2O_3$. FIG. 3 is plotted in equivalent % and along each axis of ordinates the equivalent % of oxygen is shown (the equivalent % of nitrogen is 100% minus the equivalent % of oxygen). Along the axis of abscissas, the equivalent % of yttrium is shown (the equivalent % of aluminum is 100% minus the equivalent % of yttrium). In FIG. 3, line, i.e. polygon, P1N1KJ but not including lines KJ and P1J encompasses and defines the composition of the sintered body produced by the present process; and FIG. 4 is an enlarged view of the section of FIG. 3 showing polygon P1N1KJ and also showing polygon QTXJ.

FIGS. 1 and 3 show the same composition diagram showing the subsolidus phase equilibria in the reciprocal ternary system comprised of AlN, YN, $Y_2O_3$ and $Al_2O_3$ and differ only in that FIG. 1 shows the polygon ABCDEF of Ser. No. 553,213 and the line ZZ', whereas FIG. 3 shows the polygon P1N1KJ. The composition defined and encompassed by the polygon ABCDEF does not include the composition of the present invention.

FIGS. 1 and 2 were developed algebraically on the basis of data produced by forming a particulate mixture of YN of predetermined oxygen content and AlN powder of predetermined oxygen content, and in a few instances a mixture of AlN, YN and $Y_2O_3$ powders, under nitrogen gas, shaping the mixture into a compact under nitrogen gas and sintering the compact for time periods ranging from 1 to 1.5 hours at sintering temperatures ranging from about 1860° C. to about 2050° C. in nitrogen gas at ambient pressure. More specifically, the entire procedure ranging from mixing of the powders to sintering the compact formed therefrom was carried out in a nonoxidizing atmosphere of nitrogen.

Polygons P1N1KJ and QTXJ of FIGS. 3 and 4 also were developed algebraically on the basis of data produced by the examples set forth herein as well as other experiments which included runs carried out in a manner similar to that of the present examples.

The best method to plot phase equilibria that involve oxynitrides and two different metal atoms, where the metal atoms do not change valence, is to plot the compositions as a reciprocal ternary system as is done in FIGS. 1 and 3. In the particular system of FIGS. 1 and 3 there are two types of non-metal atoms (oxygen and nitrogen) and two types of metal atoms (yttrium and aluminum). The Al, Y, oxygen and nitrogen are assumed to have a valence of $+3$, $+3$, $-2$, and $-3$, respectively. All of the Al, Y, oxygen and nitrogen are assumed to be present as oxides, nitrides or oxynitrides, and to act as if they have the aforementioned valences.

The phase diagrams of FIGS. 1 to 4 are plotted in equivalent percent. The number of equivalents of each of these elements is equal to the number of moles of the particular element multiplied by its valence. Along the ordinate is plotted the number of oxygen equivalents multiplied by 100% and divided by the sum of the oxygen equivalents and the nitrogen equivalents. Along the abscissa is plotted the number of yttrium equivalents multiplied by 100% and divided by the sum of the yttrium equivalents and the aluminum equivalents. All compositions of FIGS. 1 to 4 are plotted in this manner.

Compositions on the phase diagrams of FIGS. 1 to 4 can also be used to determine the weight percent and the volume percent of the various phases. For example, a particular point in the polygon P1N1KJ in FIG. 3 or 4 can be used to determine the phase composition of the polycrystalline body at that point.

FIGS. 1 to 4 show the composition and the phase equilibria of the polycrystalline body in the solid state.

In copending U.S. patent application Ser. No. 553,213 entitled "High Thermal Conductivity Aluminum Nitride Ceramic Body" filed on Nov. 18, 1983, in the names of Irvin Charles Huseby and Carl Francis Bobik and assigned to the assignee hereof and incorporated herein by reference, there is disclosed the process for producing a polycrystalline aluminum nitride ceramic body having a composition defined and encompassed by line ABCDEF but not including lines CD and EF of FIG. 1 therein (also shown as prior art FIG. 1 herein), a porosity of less than about 10% by volume of said body and a thermal conductivity greater than 1.0 W/cm·K at 22° C. which comprises forming a mixture comprised of aluminum nitride powder and an yttrium additive selected from the group consisting of yttrium, yttrium hydride, yttrium nitride and mixtures thereof, said aluminum nitride and yttrium additive having a predetermined oxygen content, said mixture having a composition wherein the equivalent % of yttrium, aluminum, nitrogen and oxygen is defined and encompassed by line ABCDEF but not including lines CD and EF in FIG. 1, shaping said mixture into a compact, and sintering said compact at a temperature ranging from about 1850° C. to about 2170° C. in an atmosphere selected from the group consisting of nitrogen, argon, hydrogen and mixtures thereof to produce said polycrystalline body.

Copending Ser. No. 553,213 also discloses a polycrystalline body having a composition comprised of from greater than about 1.6 equivalent % yttrium to about 19.75 equivalent % yttrium, from about 80.25 equivalent % aluminum up to about 98.4 equivalent % aluminum, from greater than about 4.0 equivalent % oxygen to about 15.25 equivalent % oxygen and from about 84.75 equivalent % nitrogen up to about 96 equivalent % nitrogen.

Copending Ser. No. 553,213 also discloses a polycrystalline body having a phase composition comprised of AlN and a second phase containing Y and O wherein the total amount of said second phase ranges from greater than about 4.2% by volume to about 27.3% by volume of the total volume of said body, said body having a porosity of less than about 10% by volume of said body and a thermal conductivity greater than 1.0 W/cm·K at 22° C.

Briefly stated, the present process for producing the present sintered polycrystalline aluminum nitride ceramic body having a composition defined and encompassed by line, i.e. polygon, P1N1KJ but not including lines KJ and P1J of FIGS. 3 or 4, a porosity of less than about 10% by volume, and preferably less than about 4% by volume of said body and a thermal conductivity greater than 1.00 W/cm·K at 25° C., and preferably a minimum of about 1.50 W/cm·K at 25° C. comprises the steps:

(a) forming a mixture comprised of aluminum nitride powder containing oxygen, yttrium oxide or a precursor therefor, and a carbonaceous additive selected from the group consisting of free carbon, a carbonaceous organic material and mixtures thereof, said carbonaceous organic material thermally decomposing at a temperature ranging from about 50° C. to about 1000° C. to free carbon and gaseous product of decomposition which vaporizes away, shaping said mixture into a compact, said mixture and said compact having a composition wherein the equivalent % of yttrium and aluminum ranges between points K and P1 of FIGS. 3 or 4, which is from greater than about 0.35 equivalent % to less than about 4.4 equivalent % yttrium and from greater than about 95.6 equivalent % to less than about 99.65 equivalent % aluminum, said compact having an equivalent % composition of Y, Al, O and N outside the composition defined and encompassed by polygon P1N1KJ of FIGS. 3 or 4, (b) heating said compact in a nonoxidizing atmosphere at a temperature up to about 1200° C. thereby providing yttrium oxide and free carbon, (c) heating said compact in a nitrogen-containing nonoxidizing atmosphere at a temperature ranging from about 1350° C. to a temperature sufficient to deoxidize the compact but below its pore closing temperature reacting said free carbon with oxygen contained in said aluminum nitride producing a deoxidized compact, said deoxidized compact having a composition wherein the equivalent % of Al, Y, O and N is defined and encompassed by polygon P1N1KJ but not including lines KJ and P1J of FIG. 3 or 4, said free carbon being in an amount which produces said deoxidized compact, and (d) sintering said deoxidized compact in a nitrogen-containing nonoxidizing atmosphere at a temperature of at least about 1860° C. producing said polycrystalline body.

In the present process, the composition of the deoxidized compact in equivalent % is the same as or does not differ significantly from that of the resulting sintered body in equivalent %.

In the present invention, oxygen content can be determined by neutron activation analysis.

By weight % or % by weight of a component herein, it is meant that the total weight % of all the components is 100%.

By ambient pressure herein, it is meant atmospheric or about atmospheric pressure.

By specific surface area or surface area of a powder herein, it is meant the specific surface area according to BET surface area measurement.

Briefly stated, in one embodiment, the present process for producing a sintered polycrystalline aluminum nitride ceramic body having a composition defined and encompassed by line, i.e. polygon, QTXJ but not including lines QJ and XJ of FIGS. 3 or 4, a porosity of less than about 10% by volume, and preferably less than about 2% by volume of said body and a thermal conductivity greater than 1.00 W/cm·K at 25° C., and preferably greater than 1.50 W/cm·K at 25° C. comprises the steps:

(a) forming a mixture comprised of aluminum nitride powder containing oxygen, yttrium oxide, and a carbonaceous additive selected from the group consisting of free carbon, a carbonaceous organic material and mixtures thereof, said carbonaceous organic material thermally decomposing at a temperature ranging from about 50° C. to about 1000° C. to free carbon and gaseous product of decomposition which vaporizes away, said free carbon having a specific surface area greater than about 100 m$^2$/g, the aluminum nitride powder in said mixture having a specific surface area ranging from about 3.4 m$^2$/g to about 6 m$^2$/g, shaping said mixture into a compact, said mixture and said compact having a composition wherein the equivalent % of yttrium and aluminum ranges from less than point X up to point Q of FIGS. 3 or 4, which is from greater than about 0.8 equivalent % to less than about 3.2 equivalent % yttrium and from greater than about 96.8 equivalent % to less than about 99.2 equivalent % aluminum, said compact having an equivalent % composition of Y, Al, O and N outside the composition defined and encompassed by polygon P1N1KJ of FIGS. 3 or 4, the aluminum nitride in said compact containing oxygen in an amount ranging from greater than about 1.40% by weight to less than about 4.50% by weight of said aluminum nitride, (b) heating said compact in a nonoxidizing atmosphere at a temperature up to about 1200° C. thereby providing yttrium oxide and free carbon, (c) heating said compact at ambient pressure in a nitrogen-containing nonoxidizing atmosphere containing at least about 25% by volume nitrogen at a temperature ranging from about 1350° C. to a temperature sufficient to deoxidize the compact but below its pore closing temperature reacting said free carbon with oxygen contained in said aluminum nitride producing a deoxidized compact, said deoxidized compact having a composition wherein the equivalent % of Al, Y, O and N is defined and encompassed by polygon QTXJ but not including lines QJ and XJ of FIGS. 3 or 4, the aluminum nitride in said compact before said deoxidation by said carbon having an oxygen content ranging from greater than about 1.4% by weight to less than about 4.5% by weight of said aluminum nitride, said free carbon being in an amount which produces said deoxidized compact, and (d) sintering said deoxidized compact at ambient pressure in a nitrogen-containing nonoxidizing atmosphere containing at least about 25% by volume nitrogen at a temperature ranging from about 1910° C. to about 2000° C., preferably from about 1910° C. to about 1950° C., and in one embodiment from about 1950° C. to about 2000° C., producing said polycrystalline body.

Briefly stated, in another embodiment, the present process for producing the present sintered polycrystalline aluminum nitride ceramic body having a composition defined and encompassed by line, i.e. polygon, P1N1KJ but not including lines KJ and P1J of FIGS. 3 or 4, a porosity of less than about 10% by volume, and preferably less than about 4% by volume of said body and a thermal conductivity greater than 1.00 W/cm·K at 25° C., and preferably a minimum of 1.5 W/cm·K at 25° C. comprises the steps:

(a) processing an aluminum nitride powder into a compact for deoxidation by free carbon by providing an aluminum nitride powder having an oxygen content ranging up to about 4.4% by weight of said aluminum nitride powder, forming a mixture comprised of said aluminum nitride powder, yttrium oxide or precursor therefor, and a carbonaceous additive selected from the group consisting of free carbon, a carbonaceous organic material and mixtures thereof, said carbonaceous organic material thermally decomposing at a temperature ranging from about 50° C. to about 1000° C. to free carbon and gaseous product of decomposition which vaporizes away, shaping said mixture into a compact, said mixture and said compact having a composition wherein the equivalent % of yttrium and aluminum ranges between points K and P1 of FIGS. 3 or 4, which is from greater than about 0.35 equivalent % to less than about 4.4 equivalent % yttrium and from greater than about 95.6 equivalent % to less than about 99.65 equivalent % aluminum, said compact having an equivalent % composition of Y, Al, O and N outside the composition defined and encompassed by polygon P1N1KJ of FIGS. 3 or 4, during said processing said aluminum nitride picking up oxygen, the oxygen content of said aluminum nitride in said compact before said deoxidation by carbon ranging from greater than about 0.6% by weight, and preferably greater than about 1.40% by weight, up to about 4.50% by weight of said aluminum nitride, (b) heating said compact in a nonoxidizing atmosphere at a temperature up to about 1200° C. thereby providing yttrium oxide and free carbon, (c) heating said compact in a nitrogen-containing nonoxidizing atmosphere at a temperature ranging from about 1350° C. to a temperature sufficient to deoxidize the compact but below its pore closing temperature reacting said free carbon with oxygen contained in said aluminum nitride producing a deoxidized compact, said deoxidized compact having a composition wherein the equivalent % of Al, Y, O and N is defined and encompassed by polygon P1N1KJ but not including lines KJ and P1J of FIG. 3 or 4, said free carbon being in an amount which produces said deoxidized compact, and (d) sintering said deoxidized compact in a nitrogen-containing nonoxidizing atmosphere at a temperature of at least about 1860° C. producing said polycrystalline body.

Briefly stated, in another embodiment, the present process for producing a sintered polycrystalline aluminum nitride ceramic body having a composition defined and encompassed by polygon QTXJ but not including lines QJ and XJ of FIGS. 3 or 4, a porosity of less than about 10% by volume and preferably less than about 2% by volume of said body and a thermal conductivity greater than 1.00 W/cm·K at 25° C., and preferably greater than about 1.50 W/cm·K at 25° C. comprises the steps:

(a) processing an aluminum nitride powder into a compact for deoxidation by free carbon by providing an aluminum nitride powder having an oxygen content ranging from greater than about 1.00% by weight to less than about 4.00% by weight of said aluminum nitride powder, forming a mixture comprised of said aluminum nitride powder, yttrium oxide or precursor therefor, and a carbonaceous additive selected from the group consisting of free carbon, a carbonaceous organic material and mixtures thereof, said carbonaceous organic material thermally decomposing at a temperature ranging from about 50° C. to about 1000° C. to free carbon and gaseous product of decomposition which vaporizes away, said free carbon having a specific surface area greater than about 100 $m^2/g$, the aluminum nitride powder in said mixture having a specific surface area ranging from about 3.4 $m^2/g$ to about 6 $m^2/g$, shaping said mixture into a compact, said mixture and said compact having a composition wherein the equivalent % of yttrium and aluminum ranges from less than point X up to point Q of FIGS. 3 or 4, which is from greater than about 0.8 equivalent % to about 3.2 equivalent % yttrium and from greater than about 96.8 equivalent % to less than about 99.2 equivalent % aluminum, said compact having an equivalent % composition of Y, Al, O and N outside the composition defined and encompassed by polygon P1N1KJ of FIGS. 3 or 4, during said processing said aluminum nitride picking up oxygen, the oxygen content of said aluminum nitride in said compact before said deoxidation by carbon ranging from greater than about 1.40% by weight up to about 4.50% by weight of said aluminum nitride and being greater than said oxygen content of said starting aluminum nitride powder by an amount ranging from greater than about 0.03% by weight up to about 3.00% by weight of said aluminum nitride, (b) heating said compact in a nonoxidizing atmosphere at a temperature up to about 1200° C. thereby providing yttrium oxide and free carbon, (c) heating said compact at ambient pressure in a nitrogen-containing nonoxidizing atmosphere containing at least about 25% by volume nitrogen at a temperature ranging from about 1350° C. to a temperature sufficient to deoxidize the compact but below its pore closing temperature thereby reacting said free carbon with oxygen contained in said aluminum nitride producing a deoxidized compact, said deoxidized compact having a composition wherein the equivalent % of Al, Y, O and N is defined and encompassed by polygon QTXJ but not including lines QJ and XJ of FIG. 4, said free carbon being in an amount which produces said deoxidized compact, and (d) sintering said deoxidized compact at ambient pressure in a nitrogen-containing nonoxidizing atmosphere containing at least about 25% by volume nitrogen at a temperature ranging from about 1910° C. to about 2000° C., preferably from about 1910° C. to about 1950° C., and in one embodiment from about 1950° C. to about 2000° C., producing said polycrystalline body.

In another embodiment of the present process, said mixture and said compact have a composition wherein the equivalent % of yttrium and aluminum ranges between points K and P but does not include points K and P of FIG. 4, said yttrium ranging from greater than about 0.55 equivalent % to less than about 4.4 equivalent %, said aluminum ranging from greater than about 95.6 equivalent % to less than about 99.45 equivalent %, and said sintered body and said deoxidized compact are comprised of a composition wherein the equivalent percent of Al, Y, O and N is defined and encompassed by polygon PONKJ but does not include lines KJ and PJ of FIG. 4.

In another embodiment of the present process, said mixture and said compact have a composition wherein the equivalent % of yttrium and aluminum ranges from point N up to point P1 of FIG. 4, i.e. said yttrium ranging from greater than about 0.35 equivalent % to about 2.9 equivalent % and said aluminum ranging from about 97.1 equivalent % to less than about 99.65 equivalent %, and said sintered body and said deoxidized compact are comprised of a composition wherein the equivalent percent of Al, Y, O and N is defined and encompassed by polygon P1N1NOP but does not include line P1P of FIG. 4.

In another embodiment of the present process, to produce a sintered polycrystalline aluminum nitride ceramic body having a composition defined and encompassed by polygon QTY1Y2 but excluding line QY2 of FIG. 4, said mixture and said compact have a composition wherein the equivalent % of yttrium and aluminum ranges from point Y1 up to point Q, i.e. said yttrium ranging from greater than about 0.8 equivalent % to about 2.0 equivalent % and said aluminum ranging from about 98.0 equivalent % to less than about 99.2 equivalent %.

In another embodiment of the present process, said mixture and said compact have a composition wherein the equivalent % of yttrium and aluminum ranges between points K and P but does not include points K and P of FIG. 4, i.e. said yttrium ranging from greater than about 0.55 equivalent % to less than about 4.4 equivalent % and said aluminum ranging from greater than about 95.6 equivalent % to less than about 99.45 equivalent %, and said sintered body and said deoxidized compact are comprised of a composition wherein the equivalent percent of Al, Y, O and N is defined and encompassed by polygon PONKJ but does not include lines NK, KJ and PJ of FIG. 4.

In yet another embodiment of the present process, said mixture and said compact have a composition wherein the equivalent % of yttrium and aluminum ranges from point N1 up to point K of FIG. 4, i.e. said yttrium ranging from about 1.9 equivalent % to less than about 4.4 equivalent % and said aluminum ranging from greater than about 95.6 equivalent % to about 98.1 equivalent %, and said sintered body and said deoxidized compact are comprised of a composition wherein the equivalent percent of Al, Y, O and N is defined by line N1K but excluding point K of FIG. 4.

In another embodiment of the present process to produce a sintered polycrystalline aluminum nitride ceramic body having a composition defined and encompassed by polygon QTXJ but not including lines QJ and XJ of FIG. 4 and a porosity of less than 1% by volume of the body, the free carbon has a specific surface area greater than about 100 m²/g, the aluminum nitride in said mixture has a specific surface area ranging from about 3.7 m²/g to about 6.0 m²/g, all firing of the compact is carried out in nitrogen, and at a sintering temperature ranging from about 1910° C. to about 1950° C., the resulting sintered body has a thermal conductivity greater than 1.50 W/cm·K at 25° C., and at a sintering temperature ranging from about 1950° C. to about 2000° C., the resulting sintered body has a thermal conductivity greater than about 1.67 W/cm·K at 25° C.

In another embodiment of the present process, to produce a sintered polycrystalline aluminum nitride ceramic body having a composition defined and encompassed by polygon QTY1Y2 but excluding line QY2 of FIG. 4 which contains carbon in an amount of less than about 0.04% by weight of the sintered body and has a thermal conductivity greater than 1.77 W/cm·K at 25° C. and a porosity of less than 1% by volume of the body, the aluminum nitride in said mixture has a specific surface area ranging from about 3.4 m²/g to about 6.0 m²/g, the free carbon has a specific surface area greater than 100 m²/g, all firing of the compact is carried out in nitrogen and the sintering temperature ranges from about 1950° C. to about 2000° C.

In another embodiment of the present process, to produce a sintered polycrystalline aluminum nitride body having a composition defined and encompassed by polygon QTY1Y2 but excluding line QY2 of FIG. 4 which contains carbon in an amount of less than about 0.04% by weight of the sintered body and has a thermal conductivity greater than 1.68 W/cm·K at 25° C. and a porosity of less than 1% by volume of the sintered body, the aluminum nitride in said mixture has a specific surface area ranging from about 3.7 m²/g to about 6.0 m²/g, the free carbon has a specific surface area greater than 100 m²/g, all firing of the compact is carried out in nitrogen and the sintering temperature ranges from about 1910° C. to about 1950° C.

In another embodiment of the present process, to produce a sintered polycrystalline aluminum nitride ceramic body having a composition defined and encompassed by polygon QTY1Y2 but excluding line QY2 of FIG. 4 which has a thermal conductivity greater than 1.57 W/cm·K at 25° C. and a porosity of less than 1% by volume of the sintered body, the aluminum nitride in said mixture has a specific surface area ranging from about 3.7 m²/g to about 6.0 m²/g, the free carbon has a specific surface area greater than 100 m²/g, all firing of the compact is carried out in nitrogen and the sintering temperature ranging from about 1910° C. to about 1950° C.

In another embodiment of the present process, said mixture and said compact have a composition wherein the equivalent % of yttrium and aluminum ranges between points K and P but does not include points K and P of FIG. 4, i.e. said yttrium ranging from greater than about 0.55 equivalent % to less than about 4.4 equivalent % and said aluminum ranging from greater than about 95.6 equivalent % to less than about 99.45 equivalent %, and said sintered body and said deoxidized compact are comprised of a composition wherein the equivalent percent of Al, Y, O and N is defined and encompassed by polygon PONKJ but does not include lines NK, KJ and PJ of FIG. 4, said free carbon has a specific surface area greater than about 100 m²/g, said aluminum nitride powder in such mixture has a specific surface area ranging from about 3.4 m²/g to about 6.0 m²/g, said sintering atmosphere is nitrogen, said sintering temperature is from about 1965° C. to about 2050° C., and said sintered body has a porosity of less than about 2% by volume, and preferably less than about 1% by volume, of said body and has a thermal conductivity greater than 1.67 W/cm·K at 25° C.

In yet another embodiment of the present process, said mixture and said compact have a composition wherein the equivalent % of yttrium and aluminum ranges from point N1 up to point K of FIG. 4 and said sintered body and said deoxidized compact are comprised of a composition wherein the equivalent percent of Al, Y, O and N is defined by line N1K but excluding point K of FIG. 4, said free carbon has a specific surface area greater than about 100 m²/g, said aluminum nitride powder in said mixture has a specific surface area ranging from about 3.6 m²/g to about 6.0 m²/g, said sintering atmosphere is nitrogen, said sintering temperature is from about 1970° C. to about 2050° C., and said sintered body has a thermal conductivity greater than 1.50 W/cm·K at 25° C.

The calculated compositions of particular points in FIGS. 3 or 4 in the polygon P1N1KJ are shown in Table I as follows:

TABLE I

| Point | Composition (Equivalent %) | | Vol % and (Wt %) of Phases* | | |
|---|---|---|---|---|---|
| | Y | Oxygen | AlN | $Y_2O_3$ | $Y_4Al_2O_9$ |
| P | 0.55 | 1.15 | 98.7(98.2) | — | 1.3(1.8) |
| O | 0.6 | 1.1 | 98.7(98.1) | 0.2(0.3) | 1.1(1.6) |
| N | 2.9 | 2.9 | 94.9(92.4) | 5.1(7.6) | — |
| K | 4.4 | 4.4 | 92.4(88.7) | 7.6(11.3) | — |
| J | 2.5 | 4.1 | 94.0(91.9) | — | 6.0(8.1) |
| Q | 0.8 | 1.55 | 98.1(97.3) | — | 1.9(2.7) |
| T | 1.0 | 1.55 | 97.8 | 0.7 | 1.5 |
| X | 3.2 | 4.2 | 93.4 | 2.8 | 3.8 |
| Y1 | 2.0 | 2.75 | 95.8 | 1.5 | 2.7 |
| Y2 | 1.9 | 3.15 | 95.5 | — | 4.5 |
| N1 | 1.9 | 1.9 | 96.7(94.9) | 3.3(5.1) | — |
| P1 | 0.35 | 0.85 | 99.2(98.8) | — | 0.8(1.2) |

*Wt % is given in parentheses,
Vol % is given without parentheses

The polycrystalline aluminum nitride body produced by the present process has a composition defined and encompassed by polygon, i.e. line, P1N1KJ but not including lines KJ and P1J of FIGS. 3 or 4. The sintered polycrystalline body of polygon P1N1KJ but not including lines KJ and P1J of FIGS. 3 or 4 produced by the present process has a composition comprised of from greater than about 0.35 equivalent % yttrium to less than about 4.4 equivalent % yttrium, from greater than about 95.6 equivalent % aluminum to less than about 99.65 equivalent % aluminum, from greater than about 0.85 equivalent % oxygen to less than about 4.4 equivalent % oxygen and from greater than about 95.6 equivalent % nitrogen to less than about 99.15 equivalent % nitrogen.

Also, the polycrystalline body defined and encompassed by polygon P1N1KJ but not including lines KJ and P1J of FIG. 3 or 4 is comprised of an AlN phase and a second phase which ranges in amount from greater than about 0.8% by volume at a composition next to point P1 to less than about 7.6% by volume at a composition adjacent to point K of the total volume of the sintered body, and such second phase can be comprised of $Y_2O_3$ or a mixture of $Y_4Al_2O_9$ and $Y_2O_3$. When the second phase is comprised of $Y_2O_3$, i.e. at line N1K, it ranges in amount from about 3.3% by volume to less than about 7.6% by volume of the sintered body.

However, when the second phase is a mixture of second phases comprised of $Y_2O_3$ and $Y_4Al_2O_9$, i.e. when the polycrystalline body is defined and encompassed by polygon P1N1KJ excluding lines KJ, P1J and N1K, such mixture of phases ranges in amount from greater than about 0.8% by volume to less than about 7.6% by volume of the sintered body. Specifically, both of these second phases are always present in at least a trace amount, i.e. at least an amount detectable by X-ray diffraction analysis, and in such mixture, the $Y_2O_3$ phase can range to less than about 7.6% by volume of the sintered body, and the $Y_4Al_2O_9$ phase can range to less than about 6.0% by volume of the total volume of the sintered body. More specifically, when a mixture of $Y_4Al_2O_9$ and $Y_2O_3$ phases is present, the amount of $Y_4Al_2O_9$ phase decreases and the amount of $Y_2O_3$ phase increases as the composition moves away from line P1J toward line N1K in FIG. 4. Line P1J in FIG. 4 is comprised of AlN phase and a second phase comprised of $Y_4Al_2O_9$.

The sintered polycrystalline body of polygon PONKJ but not including lines KJ and PJ of FIGS. 3 or 4 produced by the present process has a composition comprised of from greater than about 0.55 equivalent % yttrium to less than about 4.4 equivalent % yttrium, from greater than about 95.6 equivalent % aluminum to less than about 99.45 equivalent % aluminum, from about 1.1 equivalent % oxygen to less than about 4.4 equivalent % oxygen and from greater than about 95.6 equivalent % nitrogen to about 98.9 equivalent % nitrogen.

Also, the polycrystalline body defined and encompassed by polygon PONKJ but not including lines KJ and PJ of FIG. 3 or 4 is comprised of an AlN phase and a second phase which ranges in amount from about 1.3% by volume at line PO to less than about 7.6% by volume at a composition next to point K of the total volume of the sintered body, and such second phase can be comprised of $Y_2O_3$ or a mixture of $Y_4Al_2O_9$ and $Y_2O_3$. When the second phase is comprised of $Y_2O_3$, i.e. at line NK, it ranges in amount from about 5.1% by volume to less than about 7.6% by volume of the sintered body. However, when the second phase is a mixture of second phases comprised of $Y_2O_3$ and $Y_4Al_2O_9$, both of these second phases are always present in at least a trace amount, i.e. at least an amount detectable by X-ray diffraction analysis, and in such mixture, the $Y_2O_3$ phase can range to less than about 7.6% by volume of the sintered body, and the $Y_4Al_2O_9$ phase can range to less than about 6.0% by volume of the total volume of the sintered body. More specifically, when a mixture of $Y_4Al_2O_9$ and $Y_2O_3$ phases is present, the amount of $Y_4Al_2O_9$ phase decreases and the amount of $Y_2O_3$ phase increases as the composition moves away from line PJ toward line NK in FIG. 4. Line PJ in FIG. 4 is comprised of AlN phase and a second phase comprised of $Y_4Al_2O_9$.

As can be seen from Table I, the polycrystalline body at point K composition would have the largest amount of second phase present which at point K would be $Y_2O_3$.

In another embodiment, the polycrystalline aluminum nitride body produced by the present process has a composition defined and encompassed by polygon P1N1NOP but not including line P1P of FIGS. 3 or 4. The sintered polycrystalline body of polygon P1N1NOP but not including line P1P of FIGS. 3 or 4 produced by the present process has a composition comprised of from greater than about 0.35 equivalent % yttrium to about 2.9 equivalent % yttrium, from about 97.1 equivalent % aluminum up to about 99.65 equivalent % aluminum, from greater than about 0.85 equivalent % oxygen to about 2.9 equivalent % oxygen and from about 97.1 equivalent % nitrogen to less than about 99.15 equivalent % nitrogen.

Also, the polycrystalline body defined and encompassed by polygon P1N1NOP but not including line P1P of FIGS. 3 or 4 is comprised of an AlN phase and a second phase which ranges in amount from greater than about 0.8% by volume at a composition next to point P1 to about 5.1% by volume at point N of the total volume of the sintered body, and such second phase can be comprised of $Y_2O_3$ or a mixture of $Y_4Al_2O_9$ and $Y_2O_3$. When the second phase is comprised of $Y_2O_3$, i.e. at line N1N, it ranges in amount from about 3.3% by volume to about 5.1% by volume of the sintered body. However, when the second phase is a mixture of second phases comprised of $Y_2O_3$ and $Y_4Al_2O_9$, i.e. when the polycrystalline body is defined and encompassed by polygon P1N1NOP excluding lines P1P and N1N, such mixture of phases ranges in amount from greater than about 0.8% by volume to less than about 5.1% by volume of the sintered body. Specifically, both of these second phases are always present in at least a trace amount, i.e. at least an amount detectable by X-ray diffraction analysis, and in such mixture, the $Y_2O_3$ phase can range to less than about 5.1% by volume of the sintered body, and the $Y_4Al_2O_9$ phase can range to less than about 1.3% by volume of the total volume of the sintered body. More specifically, when a mixture of $Y_4Al_2O_9$ and $Y_2O_3$ phases is present, the amount of $Y_4Al_2O_9$ phase decreases and the amount of $Y_2O_3$ phase increases as the composition moves away from line P1P toward line N1N in FIG. 4. Line P1P in FIG. 4 is comprised of AlN phase and a second phase comprised of $Y_4Al_2O_9$.

In another embodiment, the polycrystalline aluminum nitride body produced by the present process has a composition defined and encompassed by polygon, i.e. line, QTXJ but not including lines QJ and XJ of FIGS. 3 or 4. The sintered polycrystalline body of polygon QTXJ but not including lines QJ and XJ of FIGS. 3 or 4 produced by the present process has a composition comprised of from greater than about 0.8 equivalent % yttrium to about 3.2 equivalent % yttrium, from about 96.8 equivalent % aluminum up to about 99.2 equivalent % aluminum, from greater than about 1.55 equivalent % oxygen to about 4.2 equivalent % oxygen and from about 95.8 equivalent % nitrogen to less than about 98.45 equivalent % nitrogen.

Also, the polycrystalline body defined and encompassed by polygon QTXJ but not including lines QJ and XJ of FIG. 3 or 4 is comprised of an AlN phase and a second phase which ranges in amount from greater than about 1.9% by volume to less than about 6.6% by volume of the total volume of the sintered body, and such second phase is comprised of a mixture of $Y_4Al_2O_9$ and $Y_2O_3$. Specifically, the $Y_2O_3$ phase ranges from a trace amount, i.e. at least an amount detectable by X-ray diffraction analysis, to less than about 2.8% by volume of the sintered body, and the $Y_4Al_2O_3$ phase ranges from about 1.5% by volume to less than about 6.0% by volume of the sintered body. More specifically, the amount of $Y_4Al_2O_9$ phase decreases and the amount of $Y_2O_3$ phase increases as the composition moves away from line QJ toward line TX in FIG. 4.

In one embodiment, the present polycrystalline body has a composition defined and encompassed by polygon PONKJ but not including lines NK, KJ and PJ of FIGS. 3 or 4, i.e. it has a composition comprised of from greater than about 0.55 equivalent % yttrium to less than about 4.4 equivalent % yttrium, from greater than about 95.6 equivalent % aluminum to less than about 99.45 equivalent % aluminum, from about 1.1 equivalent % oxygen to less than about 4.4 equivalent % oxygen and from greater than about 95.6 equivalent % nitrogen to about 98.9 equivalent % nitrogen. In this embodiment, the phase composition of the sintered body is comprised of AlN and a mixture of second phases comprised of and $Y_4Al_2O_9$ and $Y_2O_3$. This second phase mixture ranges in amount from about 1.3% by volume to less than about 7.6% by volume of the body and always contains both $Y_4Al_2O_9$ and $Y_2O_3$ at least in a trace amount, i.e. at least in an amount detectable by X-ray diffraction analysis. Specifically, in this embodiment, the amount of $Y_2O_3$ phase can range to less than about 7.6% by volume of the sintered body, and the amount of $Y_4Al_2O_9$ phase can range to less than about 6.0% by volume of the sintered body.

In another embodiment, the present process produces a sintered body defined by line N1K but not including point K of FIG. 4 which has a phase composition comprised of AlN and $Y_2O_3$ wherein the $Y_2O_3$ phase ranges from about 3.3% by volume to less than about 7.6% by volume of the body. Line N1K but not including point K of FIG. 4 has a composition comprised of from about 1.9 equivalent % to less than about 4.4 equivalent % yttrium, from greater than about 95.6 equivalent % to about 98.1 equivalent % aluminum, from about 1.9 equivalent % to less than about 4.4 equivalent % oxygen and from greater than about 95.6 equivalent % to about 98.1 equivalent % nitrogen.

In another embodiment, the present process produces a sintered body defined by polygon QTY1Y2 but excludes line QY2 of FIG. 4 which has a phase composition comprised of AlN and a second phase mixture of $Y_2O_3$ and $Y_4Al_2O_9$ wherein the total amount of this second phase mixture ranges from greater than about 1.9% by volume to less than about 4.5% by volume of the total volume of the body. Specifically, the $Y_2O_3$ phase ranges from a trace amount, i.e. at least an amount detectable by X-ray diffraction analysis, to about 1.5% by volume of the total volume of the sintered body, and the $Y_4Al_2O_9$ phase ranges from about 1.5% by volume to less than about 4.5% by volume of the body. Polygon QTY1Y2 of FIG. 4 has a composition comprised of from greater than about 0.8 equivalent % to about 2.0 equivalent % yttrium, from about 98.0 equivalent % to less than about 99.2 equivalent % aluminum, from greater than about 1.55 equivalent % to less than about 3.15 equivalent % oxygen and from greater than about 96.85 equivalent % to less than about 98.45 equivalent % nitrogen.

In the present process, the aluminum nitride powder can be of commercial or technical grade. Specifically, it should not contain any impurities which would have a significantly deleterious effect on the desired properties of the resulting sintered product. The starting aluminum nitride powder used in the present process contains oxygen generally ranging in amount up to about 4.4% by weight and usually ranging from greater than about 0.5% by weight to less than about 4.0% by weight, i.e. up to about 4% by weight, and in one embodiment ranging from greater than about 1.00% by weight to less than about 4.00% by weight. Typically, commercially available aluminum nitride powder contains from about 1.5 weight % (2.6 equivalent %) to about 3 weight % (5.2 equivalent %) of oxygen and such powders are most preferred on the basis of their substantially lower cost.

Generally, the present starting aluminum nitride powder has a specific surface area which can range widely, and generally it ranges up to about 10 m²/g. Frequently, it has a specific surface area greater than about 1.0 m²/g, and more frequently of at least about 3.0 m²/g, usually greater than about 3.2 m²/g, and preferably at least about 3.4 m²/g.

Generally, the present aluminum nitride powder in the present mixture, i.e. after the components have been mixed, usually by milling, has a specific surface area which can range widely, and generally it ranges to about 10 m²/g. Frequently, it ranges from greater than about 1.0 m²/g to about 10 m²/g, and more frequently from about 3.2 m²/g to about 10 m²/g, and preferably it ranges from about 1.5 m²/g to about 5 m²/g, and in one embodiment it ranges from about 3.4 m²/g to about 5 m²/g, according to BET surface area measurement. Specifically, the minimum sintering temperature of a given composition of the present invention increases with increasing particle size of the aluminum nitride.

Generally, the yttrium oxide ($Y_2O_3$) additive in the present mixture has a specific surface area which can range widely. Generally, it is greater than about 0.4 m²/g and generally it ranges from greater than about 0.4 m²/g to about 6.0 m²/g, usually from about 0.6 m²/g to about 5.0 m²/g, more usually from about 1.0 m²/g to about 5.0 m²/g, and in one embodiment it is greater than 2.0 m²/g.

In the practice of this invention, carbon for deoxidation of aluminum nitride powder is provided in the form of free carbon which can be added to the mixture as elemental carbon, or in the form of a carbonaceous additive, for example, an organic compound which can thermally decompose to provide free carbon.

The present carbonaceous additive is selected from the group consisting of free carbon, a carbonaceous organic material and mixtures thereof. The carbonaceous organic material pyrolyzes, i.e. thermally decomposes, completely at a temperature ranging from about 50° C. to about 1000° C. to free carbon and gaseous product of decomposition which vaporizes away. In a preferred embodiment, the carbonaceous additive is free carbon, and preferably, it is graphite.

High molecular weight aromatic compounds or materials are the preferred carbonaceous organic materials for making the present free carbon addition since they ordinarily give on pyrolysis the required yield of particulate free carbon of submicron size. Examples of such aromatic materials are a phenolformaldehyde condensate resin known as Novolak which is soluble in acetone or higher alcohols, such as butyl alcohol, as well as many of the related condensation polymers or resins such as those of resorcinol-formaldehyde, aniline-formaldehyde, and cresolformaldehyde. Another satisfactory group of materials are derivatives of polynuclear aromatic hydrocarbons contained in coal tar, such as dibenzanthracene and chrysene. A preferred group are polymers of aromatic hydrocarbons such as polyphenylene or polymethylphenylene which are soluble in aromatic hydrocarbons.

The present free carbon has a specific surface area which can range widely and need only be at least sufficient to carry out the present deoxidation. Generally, it has a specific surface area greater than about 10 $m^2/g$, preferably greater than 20 $m^2/g$, more preferably greater than about 100 $m^2/g$, and still more preferably greater than 150 $m^2/g$, according to BET surface area measurement to insure intimate contact with the AlN powder for carrying out its deoxidation.

Most preferably, the present free carbon has as high a surface area as possible. Also, the finer the particle size of the free carbon, i.e. the higher its surface area, the smaller are the holes or pores it leaves behind in the deoxidized compact. Generally, the smaller the pores of a given deoxidized compact, the lower is the amount of liquid phase which need be generated at sintering temperature to produce a sintered body having a porosity of less than about 1% by volume of the body.

By processing of the aluminum nitride powder into a compact for deoxidation by free carbon, it is meant herein to include all mixing of the aluminum nitride powder to produce the present mixture, all shaping of the resulting mixture to produce the compact, as well as handling and storing of the compact before it is deoxidized by carbon. In the present process, processing of the aluminum nitride powder into a compact for deoxidation by free carbon is at least partly carried out in air, and during such processing of the aluminum nitride powder, it picks up oxygen from air usually in an amount greater than about 0.03% by weight of the aluminum nitride, and any such pick up of oxygen is controllable and reproducible or does not differ significantly if carried out under the same conditions. If desired, the processing of the aluminum nitride powder into a compact for deoxidation by free carbon can be carried out in air.

In the present processing of aluminum nitride, the oxygen it picks up can be in any form, i.e. it initially may be oxygen, or initially it may be in some other form, such as, for example, water. The total amount of oxygen picked up by aluminum nitride from air or other media is less than about 3.00% by weight, and generally ranges from greater than about 0.03% by weight to less than about 3.00% by weight, and usually it ranges from about 0.10% by weight to about 1.00% by weight, and preferably it ranges from about 0.15% by weight to about 0.70% by weight, of the total weight of the aluminum nitride. Generally, the aluminum nitride in the present mixture and compact prior to deoxidation of the compact has an oxygen content of less than about 4.50% by weight, and generally it ranges from greater than about 0.6% by weight, preferably greater than about 1.40% by weight, to less than about 4.50% by weight, and usually it ranges from about 2.00% by weight to about 4.00% by weight, and more usually it ranges from about 2.20% by weight to about 3.50% by weight, of the total weight of aluminum nitride.

The oxygen content of the starting aluminum nitride powder and that of the aluminum nitride in the compact prior to deoxidation is determinable by neutron activation analysis.

In a compact, an aluminum nitride containing oxygen in an amount of about 4.5% by weight or more generally is not desirable.

In carrying out the present process, a uniform or at least a significantly uniform mixture or dispersion of the aluminum nitride powder, yttrium oxide powder and carbonaceous additive, generally in the form of free carbon powder, is formed and such mixture can be formed by a number of techniques. Preferably, the powders are ball milled preferably in a liquid medium at ambient pressure and temperature to produce a uniform or significantly uniform dispersion. The milling media, which usually are in the form of cylinders or balls, should have no significant deleterious effect on the powders, and preferably, they are comprised of steel or polycrystalline aluminum nitride, preferably made by sintering a compact of milling media size of AlN powder and $Y_2O_3$ sintering additive. Generally, the milling media has a diameter of at least about ¼ inch and usually ranges from about ¼ inch to about ½ inch in diameter. The liquid medium should have no significantly deleterious effect on the powders and preferably it is non-aqueous. Preferably, the liquid mixing or milling medium can be evaporated away completely at a temperature ranging from above room or ambient temperature to below 300° C. leaving the present mixture. Preferably, the liquid mixing medium is an organic liquid such as heptane or hexane. Also, preferably, the liquid milling medium contains a dispersant for the aluminum nitride powder thereby producing a uniform or significantly uniform mixture in a significantly shorter period of milling time. Such dispersant should be used in a dispersing amount and it should evaporate or decompose and evaporate away completely or leave no significant residue, i.e. no residue which has a significant effect in the present process, at an elevated temperature below 1000° C. Generally, the amount of such dispersant ranges from about 0.1% by weight to less than about 3% by weight of the aluminum nitride powder, and generally it is an organic liquid, preferably oleic acid.

In using steel milling media, a residue of steel or iron is left in the dried dispersion or mixture which can range from a detectable amount up to about 3.0% by weight of the mixture. This residue of steel or iron in the mixture has no significant effect in the present process or on the thermal conductivity of the resulting sintered body.

The liquid dispersion can be dried by a number of conventional techniques to remove or evaporate away the liquid and produce the present particulate mixture. If desired, drying can be carried out in air. Drying of a milled liquid dispersion in air causes the aluminum nitride to pick up oxygen and, when carried out under the same conditions, such oxygen pick up is reproducible or does not differ significantly. Also, if desired, the dispersion can be spray dried.

A solid carbonaceous organic material is preferably admixed in the form of a solution to coat the aluminum nitride particles. The solvent preferably is non-aqueous. The wet mixture can then be treated to remove the solvent producing the present mixture. The solvent can be removed by a number of techniques such as by evaporation or by freeze drying, i.e. subliming off the solvent in vacuum from the frozen dispersion. In this way, a substantially uniform coating of the organic material on the aluminum nitride powder is obtained which on pyrolysis produces a substantially uniform distribution of free carbon.

The present mixture is shaped into a compact in air, or includes exposing the aluminum nitride in the mixture to air. Shaping of the present mixture into a compact can be carried out by a number of techniques such as extrusion, injection molding, die pressing, isostatic pressing, slip casting, roll compaction or forming, or tape casting to produce the compact of desired shape. Any lubricants, binders or similar shaping aid materials used to aid shaping of the mixture should have no significant deteriorating effect on the compact or the present resulting sintered body. Such shaping-aid materials are preferably of the type which evaporate away on heating at relatively low temperatures, preferably below 400° C., leaving no significant residue. Preferably, after removal of the shaping aid materials, the compact has a porosity of less than 60% and more preferably less than 50% to promote densification during sintering.

If the compact contains carbonaceous organic material as a source of free carbon, it is heated at a temperature ranging from about 50° C. to about 1000° C. to pyrolyze, i.e. thermally decompose, the organic material completely producing the present free carbon and gaseous product of decomposition which vaporizes away. Thermal decomposition of the carbonaceous organic material is carried out, preferably in a vacuum or at ambient pressure, in a nonoxidizing atmosphere. Preferably, the nonoxidizing atmosphere in which thermal decomposition is carried out is selected from the group consisting of nitrogen, hydrogen, a noble gas such as argon and mixtures thereof, and more preferably it is nitrogen, or a mixture of at least about 25% by volume nitrogen and a gas selected from the group consisting of hydrogen, a noble gas such as argon and mixtures thereof. In one embodiment, it is a mixture of nitrogen and from about 1% by volume to about 5% by volume hydrogen.

The actual amount of free carbon introduced by pyrolysis of the carbonaceous organic material can be determined by pyrolyzing the organic material alone and determining weight loss. Preferably, thermal decomposition of the organic material in the present compact is done in the sintering furnace as the temperature is being raised to deoxidizing temperature, i.e. the temperature at which the resulting free carbon reacts with the oxygen content of the AlN.

Alternately, in the present process, yttrium oxide can be provided by means of an yttrium oxide precursor. The term yttrium oxide precursor means any organic or inorganic compound which decomposes completely at a temperature below about 1200° C. to form yttrium oxide and by-product gas which vaporizes away leaving no contaminants in the sintered body which would be detrimental to the thermal conductivity. Representative of the precursors of yttrium oxide useful in the present process is yttrium acetate, yttrium carbonate, yttrium oxalate, yttrium nitrate, yttrium sulfate and yttrium hydroxide.

If the compact contains a precursor for yttrium oxide, it is heated to a temperature up to about 1200° C. to thermally decompose the precursor thereby providing yttrium oxide. Such thermal decomposition is carried out in a nonoxidizing atmosphere, preferably in a vacuum or at ambient pressure, and preferably the atmosphere is selected from the group consisting of nitrogen, hydrogen, a noble gas such as argon and mixtures thereof. Preferably, it is nitrogen, or a mixture of at least about 25% by volume nitrogen and a gas selected from the group consisting of hydrogen, a noble gas such as argon and mixtures thereof. In one embodiment, it is a mixture of nitrogen and from about 1% by volume to about 5% by volume hydrogen.

The present deoxidation of aluminum nitride with carbon, i.e. carbon-deoxidation, comprises heating the compact comprised of aluminum nitride, free carbon and yttrium oxide at deoxidation temperature to react the free carbon with at least a sufficient amount of the oxygen contained in the aluminum nitride to produce a deoxidized compact having a composition defined and encompassed by polygon P1N1KJ but not including lines KJ and P1J of FIGS. 3 or 4. This deoxidation with carbon is carried out at a temperature ranging from about 1350° C. to a temperature at which the pores of the compact remain open, i.e. a temperature which is sufficient to deoxidize the compact but below its pore closing temperature, generally up to about 1800° C., and preferably, it is carried out at from about 1600° C. to 1650° C.

The carbon-deoxidation is carried out, preferably at ambient pressure, in a gaseous nitrogen-containing nonoxidizing atmosphere which contains sufficient nitrogen to facilitate the deoxidation of the aluminum nitride. In accordance with the present invention, nitrogen is a required component for carrying out the deoxidation of the compact. Preferably, the nitrogen-containing atmosphere is nitrogen, or it is a mixture of at least about 25% by volume of nitrogen and a gas selected from the group consisting of hydrogen, a noble gas such as argon, and mixtures thereof. Also, preferably, the nitrogen-containing atmosphere is comprised of a mixture of nitrogen and hydrogen, especially a mixture containing up to about 5% by volume hydrogen.

The time required to carry out the present carbon-deoxidation of the compact is determinable empirically and depends largely on the thickness of the compact as well as the amount of free carbon it contains, i.e. the carbon-deoxidation time increases with increasing thickness of the compact and with increasing amounts of free carbon contained in the compact. Carbon-deoxidation can be carried out as the compact is being heated to sintering temperature provided that the heating rate allows the deoxidation to be completed while the pores of the compact are open and such heating rate is determinable empirically. Also, to some extent, carbon deoxidation time depends on deoxidation temperature, particle size and uniformity of the particulate mixture of the compact i.e. the higher the deoxidation temperature, the smaller the particle size and the more uniform the mixture, the shorter is deoxidation time. Also, to some extent, deoxidation time depends on its final position on the phase diagram, i.e. as line N1K is approached, deoxidation time increases. Typically, the carbon-deoxidation time ranges from about ¼ hour to about 1.5 hours.

Preferably, the compact is deoxidized in the sintering furnace by holding the compact at deoxidation temperature for the required time and then raising the temperature to sintering temperature. The deoxidation of the compact must be completed before sintering closes off pores in the compact preventing gaseous product from vaporizing away and thereby preventing production of the present sintered body.

In the present deoxidation with carbon, the free carbon reacts with the oxygen of the aluminum nitride producing carbon monoxide gas which vaporizes away. It is believed that the following deoxidation reaction occurs wherein the oxygen content of the aluminum nitride is given as $Al_2O_3$:

$$Al_2O_3 + 3C + N_2 \rightarrow 3CO_{(g)} + 2AlN \qquad (2)$$

In the deoxidation effected by carbon, gaseous carbon-containing product is produced which vaporizes away thereby removing free carbon.

If the compact before deoxidation is heated at too fast a rate through the carbon-deoxidation temperature to sintering temperature, and such too fast rate would depend largely on the composition of the compact and the amount of carbon it contains, the present carbon-deoxidation does not occur, i.e. an insufficient amount of deoxidation occurs, and a significant amount of carbon is lost by reactions (3) and/or (3A).

$$C + AlN \rightarrow AlCN_{(g)} \quad (3)$$

$$C + \tfrac{1}{2} N_2 \rightarrow CN_{(g)} \quad (3A)$$

The specific amount of free carbon required to produce the present deoxidized compact can be determined by a number of techniques. It can be determined empirically. Preferably, an initial approximate amount of carbon is calculated from Equation (2), that is the stoichiometric amount for carbon set forth in Equation (2), and using such approximate amount, the amount of carbon required in the present process to produce the present sintered body would require one or a few runs to determine if too much or too little carbon had been added. Specifically, this can be done by determining the porosity of the sintered body and by analyzing it for carbon and by X-ray diffraction analysis. If the compact contains too much carbon, the resulting deoxidized compact will be difficult to sinter and will not produce the present sintered body having a porosity of less than about 10% by volume and preferably less than about 4% by volume of the sintered body, or the sintered body will contain carbon in an excessive amount. If the compact contains too little carbon, X-ray diffraction analysis of the resulting sintered body will not show any $Y_2O_3$ phase and that its composition is not defined or encompassed by the polygon P1N1KJ not including lines KJ and P1J of FIG. 4.

The amount of free carbon used to carry out the present deoxidation should produce the present deoxidized compact leaving no significant amount of carbon in any form, i.e. no amount of carbon in any form which would have a significantly deleterious effect on the sintered body. More specifically, no amount of carbon in any form should be left in the deoxidized compact which would prevent production of the present sintered body, i.e. any carbon content in the sintered body should be low enough so that the sintered body has a thermal conductivity greater than 1.00 W/cm·K at 25° C. Generally, the present sintered body may contain carbon in some form in a trace amount, i.e. generally less than about 0.08% by weight, preferably in an amount of less than about 0.065% by weight, and more preferably less than about 0.04% by weight, and most preferably less than 0.03% by weight of the total weight of the sintered body.

A significant amount of carbon in any form remaining in the sintered body significantly reduces its thermal conductivity. An amount of carbon in any form greater than about 0.065% by weight of the sintered body is likely to significantly decrease its thermal conductivity.

The present deoxidized compact is densified, i.e. liquid-phase sintered, at a temperature which is a sintering temperature for the composition of the deoxidized compact to produce the present polycrystalline body having a porosity of less than about 10% by volume, and preferably less than about 4% by volume of the sintered body. For the present compositions defined and encompassed by polygon P1N1KJ of FIG. 4 excluding lines KJ and P1J, this sintering temperature generally is at least about 1860° C. and generally ranges from about 1860° C. to about 2050° C. with the minimum sintering temperature increasing generally from about 1860° C. for a composition represented by a point next or nearest to point J to generally about 1960° C. for a composition represented by a point next to point K to about 1980° C. at point N1 and less than about 2000° C. for a composition next to point P1 of FIG. 4. Minimum sintering temperature is dependent most strongly on composition and less strongly on particle size.

More specifically, in the present invention, for the present deoxidized compact having a constant particle size, the minimum sintering temperature occurs at a composition represented by a point next to point J within the polygon P1N1KJ and such temperature increases as the composition moves away from point J toward any point on line KN1P1.

Specifically, the minimum sintering temperature is dependent largely on the composition (i.e., position in the FIG. 4 phase diagram), the green density of the compact, i.e. the porosity of the compact after removal of shaping aid materials but before doxidation, the particle size of aluminum nitride, and to a much lesser extent the particle size of yttrium oxide and carbon. The minimum sintering temperature increases within the polygon P1N1KJ as the composition moves from next or nearest to point J to line KN1P1, as the green density of the compact decreases, and as the particle size of aluminum nitride, and to a much lesser extent, yttrium oxide and carbon increases. For example, for a composition represented by a point within polygon P1N1KJ of FIG. 4 and nearest to point J, the minimum sintering temperature varies from about 1860° C. for the particle size combination of aluminum nitride, yttrium oxide and carbon of about 5.0 m²/g, 2.8 m²/g, and 200 m²/g, respectively, to about 1890° C. for the particle size combination of aluminum nitride, yttrium oxide and carbon of about 0.5 m²/g, 0.5 m²/g, and 20 m²/g, respectively. Also, at point K, or a composition represented by a point nearest to point K within polygon P1N1KJ, the minimum sintering temperature varies from about 1960° C. for the particle size combination of AlN, $Y_2O_3$ and carbon of about 5.0 m²/g, 2.8 m²/g and 200 m²/g, respectively, to about 2000° C. for the particle size combination of AlN, $Y_2O_3$ and carbon of about 1.2 m²/g, 0.6 m²/g and 20 m²/g, respectively. Also, for example, at point N1, the minimum sintering temperature for the particle size combination of AlN, $Y_2O_3$ and carbon of about 5.0 m²/g, 2.8 m²/g and 200 m²/g, respectively, is about 1980° C.

To carry out the present liquid phase sintering, the present deoxidized compact contains sufficient equivalent percent of Y and O to form a sufficient amount of liquid phase at sintering temperature to densify the carbon deoxidized compact to produce the present sintered body. The present minimum densification, i.e. sintering, temperature depends on the composition of the deoxidized compact, i.e. the amount of liquid phase it generates. Specifically, for a sintering temperature to be operable in the present invention, it must generate at least sufficient liquid phase in the particular composition of the deoxidized compact to carry out the present liquid phase sintering to produce the present product. For a given composition, the lower the sintering temperature, the smaller is the amount of liquid phase generated, i.e. densification becomes more difficult with decreasing sintering temperature. However, a sintering temperature higher than about generally 2050° C. provides no significant advantage.

In one embodiment of the present invention, the sintering temperature ranges from about 1910° C. to about 2050° C., and in another embodiment from about 1965° C. to about 2050° C., and in another embodiment from about 1970° C. to about 2050° C., and in yet another embodiment from about 1950° C. to about 2000° C., and still in another embodiment from about 1910° C. to about 1950° C., to produce the present polycrystalline body.

For compositions defined and encompassed by the polygon QTXJ excluding lines QJ and XJ of FIG. 4, the sintering temperature ranges from about 1910° C. to about 2000° C., and the minimum sintering temperature is about 1910° C. to produce the present sintered body having a porosity of less than about 2% by volume of the body.

The deoxidized compact is sintered, preferably at ambient pressure, in a gaseous nitrogen-containing nonoxidizing atmosphere which contains at least sufficient nitrogen to prevent significant weight loss of aluminum nitride. In accordance with the present invention, nitrogen is a necessary component of the sintering atmosphere to prevent any significant weight loss of AlN during sintering, and also to optimize the deoxidation treatment and to remove carbon. Significant weight loss of the aluminum nitride can vary depending on its surface area to volume ratio, i.e. depending on the form of the body, for example, whether it is in the form of a thin or thick tape. As a result, generally, significant weight loss of aluminum nitride ranges from in excess of about 5% by weight to in excess of about 10% by weight of the aluminum nitride. Preferably, the nitrogen-containing atmosphere is nitrogen, or it is a mixture at least about 25% by volume nitrogen and a gas selected from the group consisting of hydrogen, a noble gas such as argon and mixtures thereof. Also, preferably, the nitrogen-containing atmosphere is comprised of a mixture of nitrogen and hydrogen, especially a mixture containing from about 1% by volume to about 5% by volume hydrogen.

Sintering time is determinable empirically. Typically, sintering time ranges from about 40 minutes to about 90 minutes.

In one embodiment, i.e. the composition defined by polygon P1N1KJ but not including lines N1K, P1J and KJ of FIG. 4, where the aluminum nitride in the carbon-deoxidized compact contains oxygen, the yttrium oxide further deoxidizes the aluminum nitride by reacting with the oxygen to form $Y_4Al_2O_9$ and $Y_2O_3$, thus decreasing the amount of oxygen in the AlN lattice to produce the present sintered body having a phase composition comprised of AlN and a second phase mixture comprised of $Y_2O_3$ and $Y_4Al_2O_9$.

In another embodiment, i.e. line N1K but excluding point K of FIG. 4, where the aluminum nitride in the carbon-deoxidized compact contains oxygen in an amount significantly smaller than that of polygon P1N1KJ but not including lines N1K, P1J and KJ of FIG. 4, the resulting sintered body has a phase composition comprised of AlN and $Y_2O_3$.

The present sintered polycrystalline body is a pressureless sintered ceramic body. By pressureless sintering herein it is meant the densification or consolidation of the deoxidized compact without the application of mechanical pressure into a ceramic body having a porosity of less than about 10% by volume, and preferably less than about 4% by volume.

The polycrystalline body of the present invention is liquid-phase sintered. I.e., it sinters due to the presence of a liquid phase, that is liquid at the sintering temperature and is rich in yttrium and oxygen and contains some aluminum and nitrogen. In the present polycrystalline body, the AlN grains have about the same dimensions in all directions, and are not elongated or disk shaped. Generally, the AlN in the present polycrystalline body has an average grain size ranging from about 1 micron to about 20 microns. An intergranular second phase of $Y_2O_3$ or a mixture of $Y_2O_3$ and $Y_4Al_2O_9$ is present along some of the AlN grain boundaries. The morphology of the microstructure of the present sintered body indicates that this intergranular second phase was a liquid at the sintering temperature. As the composition approaches line KJ in FIG. 4, the amount of liquid phase increases and the AlN grains in the present sintered body become more rounded and have a smoother surface. As the composition moves away from line KJ in FIG. 4 and approaches point P1, the amount of liquid phase decreases and the AlN grains in the present sintered body become less rounded and the corners of the grains become sharper.

The present sintered body has a porosity of less than about 10% by volume, and generally less than about 4% by volume, of the sintered body. Preferably, the present sintered body has a porosity of less than about 2% and most preferably less than about 1% by volume of the sintered body. Any pores in the sintered body are fine sized, and generally they are less than about 1 micron in diameter. Porosity can be determined by standard metallographic procedures and by standard density measurements.

The present process is a control process for producing a sintered body of aluminum nitride having a thermal conductivity greater than 1.00 W/cm·K at 25° C., and preferably greater than 1.50 W/cm·K at 25° C. Generally, the thermal conductivity of the present polycrystalline body is less than that of a high purity single crystal of aluminum nitride which is about 2.8 W/cm·K at 25° C. If the same procedure and conditions are used throughout the present process, the resulting sintered body has a thermal conductivity and composition which is reproducible or does not differ significantly. Generally, thermal conductivity increases with a decrease in volume % of second phase, and for a given composition with increase in sintering tempera- ture.

In the present process, aluminum nitride picks up oxygen in a controllable or substantially controllable manner. Specifically, if the same procedure and conditions are used in the present process, the amount of oxygen picked up by aluminum nitride is reproducible or does not differ significantly. Also, in contrast to yttrium, yttrium nitride and yttrium hydride, yttrium oxide does not pick up oxygen, or does not pick up any significant amount of oxygen, from air or other media in the present process. More specifically, in the present process, yttrium oxide or the present precursor therefor does not pick up any amount of oxygen in any form from the air or other media which would have any significant effect on the controllability or reproducibility of the present process. Any oxygen which yttrium oxide might pick up in the present process is so small as to have no effect or no significant effect on the thermal conductivity or composition of the resulting sintered body.

Examples of calculations for equivalent % are as follows:

For a starting aluminum nitride powder weighing 89.0 grams measured as having 2.3 weight % oxygen, it is assumed that all of the oxygen is bound to AlN as $Al_2O_3$, and that the measured 2.3 weight % of oxygen is present as 4.89 weight % $Al_2O_3$ so that the AlN powder is assumed to be comprised of 84.65 grams AlN and 4.35 grams $Al_2O_3$.

A mixture is formed comprised of 89.0 grams of the starting AlN powder, 4.72 grams of $Y_2O_3$ and 1.4 grams free carbon.

During processing, this AlN powder picks up additional oxygen by reactions similar to (4) and now contains 2.6 weight % oxygen.

$$2AlN + 3H_2O \rightarrow Al_2O_3 + 2NH_3 \qquad (4)$$

The resulting compact now is comprised of the following composition:
89.11 grams AlN powder containing 2.6 weight % oxygen, (84.19 g AlN + 4.92 g $Al_2O_3$), 4.72 grams $Y_2O_3$ and 1.4 grams carbon.

During deoxidation of the compact, all the carbon is assumed to react with $Al_2O_3$ via reaction (5)

$$Al_2O_3 + 3C + N_2 \rightarrow 2AlN + 3CO_{(g)} \qquad (5)$$

In the present invention, the carbon will not reduce $Y_2O_3$, but instead, reduces $Al_2O_3$.

After reaction (5) has gone to completion, the deoxidized compact now is comprised of the following composition which was calculated on the basis of Reaction (5):
88.34 grams AlN powder containing 0.5 weight % oxygen (87.38 grams AlN + 0.96 grams $Al_2O_3$) and 4.72 grams $Y_2O_3$.

From this weight composition, the composition in equivalent % can be calculated as follows:

|  | Wt (g) | Moles | Equivalents |
|---|---|---|---|
| AlN | 87.38 | 2.132 | 6.395 |
| $Al_2O_3$ | 0.958 | $9.40 \times 10^{-3}$ | $5.640 \times 10^{-2}$ |
| $Y_2O_3$ | 4.72 | $2.090 \times 10^{-2}$ | 0.125 |

TOTAL EQUIVALENTS = 6.577
V = Valence
M = Moles = $\frac{Wt (g)}{MW}$
MW = molecular weight
Eq = Equivalents
Eq = M × V
Valences:
Al + 3
Y + 3
N − 3
O − 2

Eq % Y in deoxidized compact = (6)

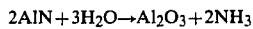 × 100% =

$\frac{0.125}{6.577}$ × 100% = 1.91%

Eq % O in deoxidized compact = (7)

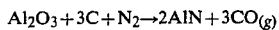 × 100% =

$\frac{5.64 + 0.125}{6.577}$ × 100% = 2.76%

This deoxidized compact as well as the sintered body contains about 1.91 equivalent % Y and about 2.76 equivalent % Oxygen.

To produce the present sintered body containing 2.0 equivalent % Y and 2.8 equivalent % O, i.e. comprised of 2 equivalent % Y, 98 equivalent % Al, 2.8 equivalent % O and 97.2 equivalent % N, using an AlN powder measured as having 2.3 weight % Oxygen (4.89 weight % $Al_2O_3$), the following calculations for weight % from equivalent % can be made:
100 grams = weight of AlN powder
x grams = weight of $Y_2O_3$ powder
z grams = weight of Carbon powder Assume that during processing, the AlN powder picks up additional oxygen by reaction similar to (9) and in the compact before deoxidation now contains 2.6 weight % oxygen (5.52 weight % $Al_2O_3$) and weighs 100.12 grams $$2AlN + 3H_2O \rightarrow Al_2O_3 + 2NH_3 \qquad (9)$$

After processing, the compact can be considered as having the following composition:

|  | Weight (g) | Moles | Equivalents |
|---|---|---|---|
| AlN | 94.59 | 2.308 | 6.923 |
| $Al_2O_3$ | 5.53 | 0.0542 | 0.325 |
| $Y_2O_3$ | x | $4.429 \times 10^{-3}x$ | 0.02657x |
| C | z | .0833z |  |

During deoxidation, 3 moles of carbon reduce 1 mole of $Al_2O_3$ and in the presence of $N_2$ form 2 moles of AlN by the reaction:

$$Al_2O_3 + 3C + N_2 \rightarrow 2AlN + 3CO \qquad (10)$$

After deoxidation, all the carbon will have reacted and the compact can be considered as having the following composition:

|  | Weight (g) | Moles | Equivalents |
|---|---|---|---|
| AlN | 94.59 + 2.275z | 2.308 + 0.05551z | 6.923 + 0.1665z |
| $Al_2O_3$ | 5.53 − 2.830z | 0.0542 − 0.02775z | 0.325 − 0.1665z |
| $Y_2O_3$ | x | $4.429 \times 10^{-3}x$ | 0.02657x |

T = Total Equivalents = 7.248 + 0.02657 x

Equivalent Fraction of Y = 0.02 = $\frac{0.02657 \, x}{T}$ (11)

Equivalent Fraction of O = 0.028 = (12)

$\frac{0.325 - 0.1665 \, z + 0.02657 \, x}{T}$

Solving Equations (11) and (12) for x and z:
x = 5.57 grams of $Y_2O_3$ powder
z = 1.60 grams of free carbon A body in a form or shape useful as a substrate, i.e. in the form of a flat thin piece of uniform thickness, or having no significant difference in its thickness, usually referred to as a substrate or tape, may become non-flat, for example, warp, during sintering and the resulting sintered body may require a heat treatment after sintering to flatten it out and make it useful as a substrate. This non-flatness or warping is likely to occur in the sintering of a body in the form of a substrate or tape having a thickness of less than about 0.070 inch and can be eliminated by a flattening treatment, i.e. by heating the sintered body, i.e. substrate or tape, under a sufficient applied pressure at a temperature in the present sintering temperature range of from about 1860° C. to about 2050° C. for a period of time determinable empirically, and allowing the sandwiched body to cool to below its sintering temperature, preferably to ambient or room temperature, before recovering the resulting flat substrate or tape.

Specifically, in one embodiment of this flattening process, the non-flat substrate or tape is sandwiched between two plates and is separated from such plates by a thin layer of AlN powder, the sandwiched body is heated to its sintering temperature, i.e. a temperature which is a sintering temperature for the sandwiched sintered body, preferably in the same atmosphere used for sintering, under an applied pressure at least sufficient to flatten the body, generally at least about 0.03 psi, for a time period sufficient to flatten the sandwiched body, and then the sandwiched body is allowed to cool to below its sintering temperature before it is recovered.

One embodiment for carrying out this flattening treatment of a sintered thin body or substrate tape comprises sandwiching the sintered non-flat substrate or tape between two plates of a material which has no significant deleterious effect thereon such as molybdenum or tungsten, or an alloy containing at least about 80% by weight of tungsten or molybdenum. The sandwiched substrate or tape is separated from the plates by a thin layer, preferably a discontinuous coating, preferably a discontinuous monolayer, of aluminum nitride powder preferably just sufficient to prevent the body from sticking to the surfaces of the plates during the flattening heat treatment. The flattening pressure is determinable empirically and depends largely on the particular sintered body, the particular flattening temperature and flattening time period. The flattening treatment should have no significant deleterious effect on the sintered body. A decrease in flattening temperature requires an increase in flattening pressure or flattening time. Generally, at a temperature ranging from about 1860° C. to about 2050° C., the applied flattening pressure ranges from about 0.03 psi to about 1.0 psi, preferably from about 0.06 psi to about 0.50 psi, and more preferably from about 0.10 psi to about 0.30 psi. Typically, for example, heating the sandwiched sintered body at the sintering temperature under a pressure of from about 0.03 psi to about 0.5 psi for 1 hour in nitrogen produces a flat body useful as a substrate, especially as a supporting substrate for a semiconductor such as a silicon chip.

The present invention makes it possible to fabricate simple, complex and/or hollow shaped polycrystalline aluminum nitride ceramic articles directly. Specifically, the present sintered body can be produced in the form of a useful shaped article without machining or without any significant machining, such as a hollow shaped article for use as a container, a crucible, a thin walled tube, a long rod, a spherical body, a tape, substrate or carrier. It is useful as a sheath for temperature sensors. It is especially useful as a substrate for a semiconductor such as a silicon chip. The dimensions of the present sintered body differ from those of the unsintered body, by the extent of shrinkage, i.e. densification, which occurs during sintering.

The present ceramic body has a number of uses. In the form of a thin flat piece of uniform thickness, or having no significant difference in its thickness, i.e. in the form of a substrate or tape, it is especially useful as packaging for integrated circuits and as a substrate for an integrated circuit, particularly as a substrate for a semiconducting Si chip for use in computers.

The invention is further illustrated by the following examples wherein the procedure was as follows, unless otherwise stated:

The starting aluminum nitride powder contained oxygen in an amount of less than 4% by weight.

The starting aluminum nitride powder was greater than 99% pure AlN exclusive of oxygen.

In Examples 8A, 8B, 9A and 9B of Table II and 30A and 30B of Table III, the starting aluminum nitride powder had a surface area of 3.84 m²/g (0.479 micron) and contained 2.10 wt % oxygen as determined by neutron activation analy- sis.

In the remaining examples of Table II, the starting aluminum nitride powder had a surface area of 4.96 m²/g (0.371 micron) and contained 2.25 wt % oxygen as determined by neutron activation analysis.

In all of the examples of Table II and Examples 30A and 30B of Table III, the $Y_2O_3$ powder, before any mixing, i.e. as received, had a surface area of about 2.75 m₂/g.

The carbon used in the examples of Tables II and III was graphite and except as indicated in Table III, it had, before any mixing, a specific surface area of 200 m²/g (0.017 micron) as listed by the vendor.

Non-aqueous heptane was used to carry out the mixing, i.e. milling, of the powders in all of the examples of Tables II and III.

In all of the examples of Tables II and III, the milling media was hot pressed aluminum nitride in the approximate form of cubes or rectangles having a density of about 100%.

In Examples 8–9, 11 and 15 of Table II and all of the examples of Table III, the AlN, $Y_2O_3$ or yttrium carbonate and carbon powders were immersed in non-aqueous heptane containing oleic acid in an amount of about 0.7% by weight of the aluminum nitride powder in a plastic jar and vibratory milled in the closed jar at room temperature for a period of time which varied from about 15 hours to about 21 hours producing the given powder mixture. In the remaining examples of Table II, no oleic acid was used, and the AlN, $Y_2O_3$ and carbon powders were immersed in non-aqueous heptane in a plastic jar and vibratory milled in the closed jar at room temperature for a period of time which varied from about 18 hours to about 68 hours depending on the mixture producing the given powder mixture.

In all of the Examples of Tables II and III, the milled liquid dispersion of the given powder mixture was dried in air at ambient pressure under a heat lamp for about 20 minutes and during such drying, the mixture picked up oxygen from the air.

In all of the Examples of Tables II and III, the dried milled powder mixture was die pressed at 5 Kpsi in air at room temperature to produce a compact having a density of roughly 55% of its theoretical density.

In those examples of Tables II and III wherein the sintered body is given as being of A size, the compacts were in the form of a disk, in those examples wherein the sintered body is given as being of C size, the compacts were in the form of a bar, and in those examples wherein the sintered body is given as being of D size, the compacts were in the form of a substrate which was a thin flat piece, like a tape, of uniform thickness, or of a thickness which did not differ significantly.

In all of the examples of Tables II and III, except Examples 17-20, the given powder mixture as well as the compact formed therefrom had a composition wherein the equivalent % of yttrium and aluminum ranged between points K and P1 of FIG. 4.

In Examples 17-20 of Table II, the given powder mixture as well as the compact formed therefrom had a composition wherein the equivalent % of yttrium and aluminum were outside the range of from point K to point P1 of FIG. 4.

The equivalent % composition of Y, Al, O and N of the compacts of all of the Examples of Tables II and III, i.e. before deoxidation, was outside the composition defined and encompassed by polygon P1N1KJ of FIG. 4.

In all of the examples of Tables II and III, the aluminum nitride in the compact before deoxidation contained oxygen in an amount ranging from greater than about 1.40% by weight to less than about 4.50% by weight of the aluminum nitride.

In each of the examples of Tables II and III, one compact was formed from the given powder mixture and was given the heat treatment shown in Tables II and III. Also, the examples in Tables II and III having the same number but including the letters A or B indicate that they were carried out in an identical manner, i.e. the powder mixtures was prepared and formed into two compacts in the same manner and the two compacts were heat treated under identical conditions, i.e. the two compacts were placed side by side in the furnace and given the same heat treatment simultaneously, and these examples numbered with an A or B may be referred to herein by their number only.

In all of the examples of Tables II and III, the same atmosphere was used to carry out the deoxidation of the compacts as was used to carry out the sintering of the deoxidized compact except that the atmosphere to carry out the deoxidization was fed into the furnace at a rate of 1 SCFH to promote removal of the gases produced by deoxidation, and the flow rate during sintering was less than about 0.1 SCFH.

The atmosphere during all of the heat treatment in all of the examples in Tables II and III was at ambient pressure which was atmospheric or about atmospheric pressure.

The furnace was a molybdenum heat element furnace.

The compacts were heated in the furnace to the given deoxidation temperature at the rate of about 100° C. per minute and then to the given sintering temperature at the rate of about 50° C. per minute.

The sintering atmosphere was at ambient pressure, i.e. atmospheric or about atmospheric pressure.

At the completion of heat treatment, the samples were furnace-cooled to about room temperature.

All of the examples of Tables II and III were carried out in substantially the same manner except as indicated in Tables II and III and except as indicated herein.

Carbon content of the sintered body was determined by a standard chemical analysis technique.

Based on the predetermined oxygen content of the starting AlN powders and the measured compositions of the resulting sintered bodies, as well as other experiments, it was calculated or estimated that in every example in Table II, the aluminum nitride in the compact before deoxidation had an oxygen content of about 0.3% by weight higher than that of the starting aluminum nitride powder.

Measured oxygen content was determined by neutron activation analysis and is given in wt %, which is % by weight of the sintered body.

In Tables II and III, in those examples where the oxygen content of the sintered body was measured, the equivalent % composition of the sintered body was calculated from the starting powder composition and from the given measured oxygen content of the sintered body. The Y, Al, N and oxygen are assumed to have their conventional valences of +3, +3, −3, −2, respectively. In the sintered bodies, the amount of Y and Al was assumed to be the same as that in the starting powder. During processing, the amount of oxygen gain and nitrogen loss was assumed to have occurred by the overall reaction:

$$2AlN + 3/2 O_2 \rightarrow Al_2O_3 + N_2 \quad (13)$$

During deoxidation, the amount of oxygen loss and nitrogen gain was assumed to have occurred by the overall reaction:

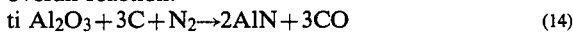

$$ti\ Al_2O_3 + 3C + N_2 \rightarrow 2AlN + 3CO \quad (14)$$

The nitrogen content of the sintered body was determined by knowing the initial oxygen content of the starting aluminum nitride powder and measuring the oxygen content of the sintered body and assuming that reactions 13 and 14 have occurred.

In Tables II and III, an approximation sign is used in front of the equivalent percent oxygen for sintered bodies whose oxygen content was not measured. Since examples having the same number but including the letter A or B were carried out under the same conditions to produce the given pair of sintered bodies simultaneously, this pair of sintered bodies will have the same oxygen content, and therefore, the oxygen content of one such sintered body is assumed to be the same as the measured oxygen content of the other such sintered body. Also, in Table II, the oxygen content of the sintered body of Example 3 (Sample 88D1) is assumed not to differ significantly from the oxygen content of Example 1B (Sample 88A1). Also, the sintered body of Example 21 (Sample 92C) is assumed to have an oxygen content which does not differ significantly from that of Example 6 (Sample 92A1).

The equivalent percent oxygen content of the sintered body of Example 8B (Sample 136A1) and of Example 9B (Sample 136C1) was calculated from the equation:

$$O = (1.34\ R + 1.81) \frac{Y}{1.88}$$

where O = equivalent percent oxygen
Y = equivalent percent yttrium $$R = \frac{v/o\ Y_4Al_2O_9}{v/o\ Y_4Al_2O_9 + v/o\ Y_2O_3}$$

The equivalent percent oxygen contents of the sintered bodies of Examples 8A and 8B are assumed to be the same.

The equivalent percent oxygen contents of the sintered bodies of Examples 9A and 9B are assumed to be the same.

The equivalent % oxygen content of the sintered bodies of Examples 22-25, 27, 29B and 26B (Samples 163A, 166A, 168A, 169A, 162A, 131D1 and 170B) was calculated from the equation $$O = (2.91 R + 3.82) \frac{Y}{3.86}.$$

The equivalent % oxygen content of the sintered bodies in Examples 29 and 31 (Samples 174A and 175A) was estimated from the X-ray diffraction analysis data. The equivalent % oxygen content of the sintered bodies of Examples 26 and 32 (Samples 170A and 175B) was assumed to be the same as that of Examples 27 and 31 (170B and 175A), respectively.

Weight loss in Tables II and III is the difference between the weight of the compact after die pressing and the resulting sintered body.

Density of the sintered body was determined by the Archimedes method.

Porosity in % by volume of the sintered body was determined by knowing the theoretical density of the sintered body on the basis of its composition and comparing that to the density measured using the following equation:

$$\text{porosity} = \left(1 - \frac{\text{measured density}}{\text{theoretical density}}\right) 100\% \quad (15)$$

Phase composition of the sintered body was determined by optical microscopy and X-ray diffraction analysis, and each sintered body was comprised in % by volume of the sintered body of aluminum nitride phase and the given volume % of the given second phases. The X-ray diffraction analysis for volume % of each second phase is accurate to about ±20% of the given value.

The thermal conductivity of the sintered body of the examples was measured at 25° C. by a steady state heatflow method using a rodshaped sample ~0.4 cm×0.4 cm×2.2 cm sectioned from the sintered body. This method was originally devised by A. Berget in 1888 and is described in an article by G. A. Slack in the "Encyclopaedic Dictionary of Physics", Ed. by J. Thewlis, Pergamon, Oxford, 1961. In this technique the sample is placed inside a high-vacuum chamber, heat is supplied at one end by an electrical heater, and the temperatures are measured with fine-wire thermocouples. The sample is surrounded by a guard cylinder. The absolute accuracy is about ±3% and the repeatability is about ±1%. As a comparison, the thermal conductivity of an $Al_2O_3$ single crystal was measured with a similar apparatus to be 0.44 W/cm·K at about 22° C.

In Tables II and III, the size of the resulting sintered body is given as A, C or D. The body of A size was in the form of a disk about 0.17 inch in thickness and about 0.32 inch in diameter. The body of C size was in the shape of a bar measuring about 0.16 inch×0.16 inch×1.7 inches. The body of D size was in the form of a substrate, i.e. a thin piece of uniform thickness, or of no significant difference in thickness, having a diameter of about 1.5 inch and a thickness of about 0.044 inch.

In all of the examples of Tables II and III, the compacts were placed on a molybdenum plate and then given the heat treatment shown in Tables II and III.

In all of the Examples of Tables II and III wherein the sintered body was of C size or of D size, the starting compact was separated from the molybdenum plate by a thin discontinuous layer of AlN powder.

The sintered body of Example 21 exhibited some non-flatness, i.e. exhibited some warping, and was subjected to a flattening treatment. Specifically, the sintered body produced in Example 21 was sandwiched between a pair of molybdenum plates. The sandwiched sintered body was separated from the molybdenum plates by a thin discontinuous coating or monolayer of aluminum nitride powder which was just sufficient to prevent sticking of the sintered body to the plates during the flattening treatment period. The top molybdenum plate exerted a pressure of about 0.11 psi on the sintered body. The sandwiched sintered body was heated in nitrogen, i.e. the same atmosphere used to sinter it, to about 1900° C. where it was held for about 1 hour and then furnace cooled to about room temperature. The resulting sintered body was flat and was of uniform thickness, i.e. its thickness did not differ significantly. This flat sintered body would be useful as a supporting substrate for a semiconductor such as a silicon chip.

EXAMPLE 1

1.98 grams of $Y_2O_3$ powder and 0.443 grams of graphite powder were added to 18 grams of aluminum nitride powder and the mixture, along with aluminum nitride milling media, was immersed in non-aqueous heptane in a plastic jar and vibratory milled in the closed jar at room temperature for about 68 hours. The resulting dispersion was dried in air under a heat lamp for about 20 minutes and during such drying, the aluminum nitride picked up oxygen from the air. During milling, the mixture picked up 0.370 gram AlN due to wear of the AlN milling media.

Equivalent portions of the resulting dried mixture were die pressed producing compacts.

Two of the compacts were placed side by side on a molybdenum plate.

The compacts were heated in nitrogen to 1600° C. where they were held for ½ hour, then the temperature was raised to 1750° C. where it was held for ½ hour, and then the temperature was raised to 2000° C. where it was held for 1 hour.

This example is shown as Examples 1A and 1B in Table II. Specifically, one of the sintered bodies, Example 1B, had a measured oxygen content of 2.05% by weight of the body and contained carbon in an amount of 0.021% by weight of the sintered body. Also, it had a phase composition comprised of AlN, 0.7% by volume of the body of YN phase, 0.6% by volume of the body of $Y_4Al_2O_9$ and 5.8% by volume of the body of $Y_2O_3$. Also, it had an equivalent % composition comprised of 3.73% O, (100%−3.73%) or 96.27% N, 3.80% Y and (100%−3.80%) or 96.20% Al.

EXAMPLES 2-21

The compacts used in Examples 2A, 2B, and 3 were produced in Example 1. In Examples 2A and 2B, the two compacts were heated at a rate of about 190° C. per minute directly to the sintering temperature of 2000° C. where they were held for 1 hour.

In Example 3, one compact was heated to 1660° C. where it was held for 1 hour and then the temperature was raised to 1940° C. where it was held for 1 hour.

In Example 5, i.e. 5A and 5B, the two compacts were heated to 1600° C. where they were held for 1 hour and then to 1900° C. where they were held for 1 hour.

In Example 6, one compact was heated to 1600° C. where it was held for 1 hour and then the temperature was raised to 1900° C. where it was held for 1 hour.

Examples 4A and 4B, and 10A and 10B were carried out in the same manner as Examples 1A and 1B except as indicated herein and except as shown in Table II.

In Example 8, i.e. 8A and 8B, the two compacts were heated to 1500° C. where they were held for ½ hour, then the temperature was raised to 1600° C. where it was held for 1 hour, and then the temperature was raised to 1900° C. where it was held for 1 hour.

In Example 9, i.e. 9A and 9B, the two compacts were heated to 1500° C. where they were held for ½ hour, then the temperature was raised to 1600° C. where it was held for 1 hour and then it was raised to 1950° C. where it was held for 1 hour.

Examples 7, 11 and 21 were carried out in the same manner as Example 6 except as indicated herein and except as shown in Table II.

Examples 13–20, i.e. 13A and B to 20A and B, were carried out in the same manner as Example 5, i.e. 5A and B, except as indicated herein and except as shown in Table II.

TABLE II

| Ex. | Sample | Powder Mixture (wt %) AlN | $Y_2O_3$ | C | Heat Treatment Deoxidation Temp (°C.) | - | Time (Hr) | + | Sintering Temp (°C.) | - | Time (Hr) | - | Atmosphere | Properties of Sintered Body Measured Oxygen (wt %) | Carbon (wt %) |
|---|---|---|---|---|---|---|---|---|---|---|---|---|---|---|---|
| 1A | 88A | 88.35 | 9.52 | 2.13 | 1600 | - | ½ | + | 2000 | - | 1 | - | $N_2$ | — | — |
|   |   |   |   |   | 1750 | - | ½ |   |   |   |   |   |   |   |   |
| 1B | 88A1 | " | " | " |   |   | " | + |   | " |   | - | " | 2.05 | 0.021 |
| 2A | 88B | " | " | " |   |   |   | - | 2000 | - | 1 | - | $N_2$ | — | — |
| 2B | 88B1 | " | " | " |   |   |   | - |   | " |   | - | " | 3.41 | 0.460 |
| 3 | 88D1 | " | " | " | 1660 | - | 1 | + | 1940 | - | 1 | - | $N_2$ | — | — |
| 4A | 91A1 | 87.97 | 9.46 | 2.57 | 1600 | - | ½ | + | 2000 | - | 1 | - | $N_2$ | 2.03 | 0.030 |
|   |   |   |   |   | 1750 | - | ½ |   |   |   |   |   |   |   |   |
| 4B | 91A2 | " | " | " |   |   | " | + |   | " |   | - | $N_2$ | — | — |
| 5A | 89A | 93.51 | 5.04 | 1.44 | 1600 | - | 1 | + | 1900 | - | 1 | - | $N_2$ | — | — |
| 5B | 89A1 | " | " | " |   |   | " | + |   | " |   | - | $N_2$ | 1.79 | 0.013 |
| 6 | 92A1 | 93.23 | 5.02 | 1.75 | 1600 | - | 1 | + | 1900 | - | 1 | - | $N_2$ | 1.54 | 0.017 |
| 7 | 92B2 | " | " | " | 1600 | - | 3/2 | + | 1900 | - | 1 | - | $N_2$ | 2.28 | 0.301 |
| 8A | 136A | 93.79 | 4.97 | 1.24 | 1500 | - | ½ | + | 1900 | - | 1 | - | $N_2$ | — | — |
|   |   |   |   |   | 1600 | - | 1 |   |   |   |   |   |   |   |   |
| 8B | 136A1 | " | " | " |   |   | " | + |   | " |   | - | " | — | 0.004 |
| 9A | 136C | " | " | " | 1500 | - | ½ | + | 1950 | - | 1 | - | $N_2$ | — | 0.009 |
|   |   |   |   |   | 1600 | - | 1 |   |   |   |   |   |   |   |   |
| 9B | 136C1 | " | " | " |   |   | " | + |   | " |   | - | " | — | — |
| 10A | 93A1 | 92.89 | 4.96 | 2.15 | 1600 | - | ½ | + | 2000 | - | 1 | - | $N_2$ | 1.15 | 0.019 |
|   |   |   |   |   | 1750 | - | ½ |   |   |   |   |   |   |   |   |
| 10B | 93A2 | " | " | " |   |   | " | + |   | " |   | - | " | — | — |
| 11 | 110A1 | 93.35 | 4.50 | 2.14 | 1600 | - | 1 | + | 2000 | - | 1 | - | $N_2$ | 1.12 | — |
| 12A | 94A1 | 96.01 | 2.13 | 1.86 | 1600 | - | 1 | + | 1900 | - | 1 | - | $N_2$ | 0.759 | 0.015 |
| 12B | 94A2 | " | " | " |   |   | " | + |   | " |   | - | " | — | — |
| 13A | 102A1 | 95.92 | 1.86 | 2.22 | 1600 | - | 1 | + | 1980 | - | 1 | - | $N_2$ | — | — |
| 13B | 102A2 | " | " | " |   |   | " | + |   | " |   | - | " | 0.468 | — |
| 14A | 95B1 | 96.86 | 1.25 | 1.89 | 1600 | - | 1 | + | 1925 | - | 1 | - | $N_2$ | 0.528 | 0.028 |
| 14B | 95B2 | " | " | " |   |   | " | + |   | " |   | - | " | — | — |
| 15A | 109B1 | 96.88 | 1.33 | 1.79 | 1600 | - | 1 | + | 2000 | - | 1 | - | $N_2$ | 0.49 | — |
| 15B | 109B2 | " | " | " |   |   | " | + |   | " |   | - | " | — | 0.039 |
| 16A | 100A1 | 96.69 | 1.29 | 2.02 | 1600 | - | 1 | + | 2000 | - | 1 | - | $N_2$ | — | — |
| 16B | 100A2 | " | " | " |   |   | " | + |   | " |   | - | " | 0.444 | — |
| 17A | 99A1 | 97.38 | 0.65 | 1.97 | 1600 | - | 1 | + | 1980 | - | 1 | - | $N_2$ | — | — |
| 17B | 99A2 | " | " | " |   |   | " | + |   | " |   | - | " | 0.243 | — |
| 18A | 101A1 | 97.54 | 0.64 | 1.82 | 1600 | - | 1 | + | 2000 | - | 1 | - | $N_2$ | 0.227 | — |
| 18B | 101A2 | " | " | " |   |   | " | + |   | " |   | - | " | — | — |
| 19A | 103A1 | 97.51 | 0.67 | 1.82 | 1600 | - | 1 | + | 2000 | - | 1 | - | $N_2$ | — | — |
| 19B | 103A2 | " | " | " |   |   | " | + |   | " |   | - | " | 0.254 | — |
| 20A | 104A1 | 97.62 | 0.67 | 1.71 | 1600 | - | 1 | + | 2050 | - | 1 | - | $N_2$ | 0.355 | — |
| 20B | 104A2 | " | " | " |   |   | " | + |   | " |   | - | " | — | 0.027 |
| 21 | 92C | 93.23 | 5.02 | 1.75 | 1600 | - | 1 | + | 1900 | - | 1 | - | $N_2$ | — | — |

| Ex. | Equivalent % Oxygen | Yttrium | Weight Loss (%) | Density (g/cc) | Approximate Porosity (vol %) | Volume % of Second Phases YN | $Y_2O_3$ | $Y_4Al_2O_9$ | Thermal Conductivity (W/cm·K @ 25° C.) | Size |
|---|---|---|---|---|---|---|---|---|---|---|
| 1A | ~3.73 | 3.80 | 6.3 | 3.39 | <1 | — | — | — | — | A |
| 1B | 3.73 | 3.80 | 6.3 | — | — | 0.7 | 5.8 | 0.6 | — | A |
| 2A | ~6.25 | 3.80 | 6.3 | 3.34 | 1 | — | — | — | — | A |
| 2B | 6.25 | 3.80 | 6.2 | — | — | — | 1.8 | 3.6 | — | A |
| 3 | ~3.7 | 3.80 | 5.4 | 3.32 | 2 | — | — | — | — | A |
| 4A | 3.70 | 3.79 | 6.6 | — | — | 0.6 | 5.8 | — | — | A |
| 4B | ~3.70 | 3.79 | 6.7 | 3.39 | <1 | — | — | — | — | A |
| 5A | ~3.17 | 1.94 | 4.6 | 3.325 | <1 | — | — | — | — | A |
| 5B | 3.17 | 1.94 | 4.7 | — | — | — | 0.4 | 3.6 | — | A |
| 6 | 2.72 | 1.94 | 5.0 | 3.33 | <1 | — | 1.5 | 2.5 | — | A |
| 7 | ~4.1 | 1.94 | 11.0 | — | — | — | — | — | — | A |
| 8A | ~2.7 | 1.90 | — | 3.29 | 1 | — | — | — | 1.72 | C |
| 8B | ~2.7 | 1.90 | 3.6 | — | — | — | 1.3 | 2.2 | — | A |
| 9A | ~2.8 | 1.90 | — | 3.33 | <1 | — | — | — | 1.81 | C |

TABLE II-continued

| | | | | | | | | | | |
|---|---|---|---|---|---|---|---|---|---|---|
| 9B | ~2.8 | 1.90 | 3.7 | — | — | — | 0.8 | 2.5 | — | A |
| 10A | 2.03 | 1.86 | 5.9 | — | — | 0.2 | 2.4 | 0.4 | — | A |
| 10B | ~2.03 | 1.86 | 5.4 | 3.33 | <1 | — | — | — | — | A |
| 11 | 1.97 | 1.74 | 5.5 | 3.12 | 6 | 0.3 | 2.1 | 0.9 | — | A |
| 12A | 1.32 | 0.81 | 5.2 | — | — | — | 0.3 | 1.5 | — | A |
| 12B | ~1.32 | 0.81 | 5.2 | 3.28 | <1 | — | — | — | — | A |
| 13A | ~0.81 | 0.70 | 4.9 | 2.23 | 32 | 0.1 | 0.7 | 0.2 | — | A |
| 13B | 0.81 | 0.70 | 5.1 | 2.43 | 26 | — | — | — | — | A |
| 14A | 0.91 | 0.47 | 5.2 | — | — | — | 0.2 | 0.8 | — | A |
| 14B | ~0.91 | 0.47 | 5.3 | 3.12 | 5 | — | — | — | — | A |
| 15A | 0.84 | 0.50 | 4.8 | 2.80 | 15 | — | — | — | — | A |
| 15B | ~0.84 | 0.50 | 5.4 | 2.79 | 15 | — | 0.2 | 0.7 | — | A |
| 16A | ~0.77 | 0.49 | 5.4 | 2.58 | 21 | — | 0.3 | 0.5 | — | A |
| 16B | 0.77 | 0.49 | 6.0 | 2.60 | 21 | — | — | — | — | A |
| 17A | ~0.42 | 0.25 | 4.9 | 2.35 | 28 | — | 0.1 | 0.2 | — | A |
| 17B | 0.42 | 0.25 | 4.9 | 2.32 | 29 | — | — | — | — | A |
| 18A | 0.39 | 0.24 | 5.0 | 2.75 | 16 | — | — | — | — | A |
| 18B | ~0.39 | 0.24 | 5.5 | 2.71 | 17 | — | 0.1 | 0.3 | — | A |
| 19A | ~0.44 | 0.25 | 5.0 | 2.52 | 23 | — | 0.1 | 0.4 | — | A |
| 19B | 0.44 | 0.25 | 5.6 | 2.54 | 22 | — | — | — | — | A |
| 20A | 0.61 | 0.25 | 5.9 | 2.90 | 11 | — | — | — | — | A |
| 20B | ~0.61 | 0.25 | 6.7 | 2.90 | 11 | — | — | 0.5 | — | A |
| 21 | ~2.7 | 1.94 | — | — | — | — | — | — | — | D(.044" thick) |

Examples 5A, 5B, 6, 8A, 8B, 9A, 9B, 10A, 10B, 11, 12A, 12B, 14A, 14B, and 21 illustrate the present invention, and the sintered body produced in these examples is useful for packaging of integrated circuits as well as for use as a substrate or carrier for a semiconductor such as a silicon chip.

In Examples 1A, 1B and 3, too much free carbon was added to the powder mixture which caused too much deoxidation of the aluminum nitride producing sintered bodies which had compositions slightly outside polygon P1N1KJ of FIG. 4 and slightly below line NK. However, Example 3 does illustrate the operability of 1940° C. as a sintering temperature in this composition area for aluminum nitride powder having a specific surface area of 4.96 m²/g.

In Examples 2A and 2B, the rate at which the compacts were heated to 2000° C. was insufficient to deoxidize the compacts before sintering as shown by the large amount of carbon remaining in the sintered body of Example 2B.

A comparison of Examples 4A and 4B with Examples 1A and 1B shows that even though more free carbon was added to the powder mixture of Examples 4A and 4B, the resulting sintered bodies had almost the same composition. This shows that with increasing amounts of free carbon in the powder mixture, the compositions of the resulting sintered bodies do not get significantly below line NK of FIG. 4.

Examples 5A and 5B illustrate the present invention. The sintered bodies of Examples 5A and 5B have the same composition, the same porosity and the same thermal conductivity. Based on a comparison of Examples 5A and 5B with Example 8A which has a very similar composition, and based on other work, it is known that the sintered bodies of Examples 5A and 5B have a thermal conductivity greater than 1.50 W/cm·K at 25° C., i.e. approximately 1.68 W/cm·K at 25° C.

Example 6 illustrates the present invention. Based on a comparison of Examples 6 and 8A which do not differ significantly in composition, and based on other work, it is known that the sintered body of Example 6 has a thermal conductivity greater than 1.50 W/cm·K at 25° C., i.e. approximately 1.72 W/cm·K at 25° C.

Example 7 illustrates that even though there was an extensive deoxidation step carried out, the use of the hydrogen atmosphere during deoxidation and sintering resulted in a sintered body which contained an excessive amount of carbon, and based on other work, it is known that this sintered body containing 0.3% carbon has a thermal conductivity below 1.00 W/cm·K at 25° C. Also, the hydrogen atmosphere in Example 7 caused an excessive amount of weight loss.

Examples 8A and 8B illustrate the present invention. The sintered bodies of Examples 8A and 8B have the same composition, the same porosity and the same thermal conductivity.

Examples 9A and 9B illustrate the present invention. The sintered bodies of Examples 9A and 9B have the same composition, the same porosity and the same thermal conductivity. A comparison of Examples 8A and 9A shows that the higher sintering temperature in Example 9A produced a sintered body with a higher thermal conductivity.

Based on other work and a comparison of Examples 10A, 10B, and 11 with Examples 8A and 9A, it is known that the sintered bodies of Examples 10A and B and 11 would have a thermal conductivity greater than 1.00 W/cm·K at 25° C.

Examples 10A and 11 of Table II, and Example 29 of Table III illustrate the present invention even though there was a small amount of YN phase formed in the sintered body. Specifically, sectioning of the sintered body of these examples showed that this YN phase was located only in the center of the body, i.e. the YN phase was black and was surrounded by the present composition which was tan. The formation of this YN phase was due to the thickness of the sintered body and its composition, and it is caused by an oxygen gradient. Specifically, from the center of the sintered body the concentration of oxygen increases by a small amount and the concentration of nitrogen decreases by a small amount occasionally resulting in the formation of a small amount of YN phase in the center of the body when it has a composition in the polygon P1N1KJ of FIG. 4, which is close to line N1K or on line N1K.

Examples 12A and 12B illustrate the present invention. The sintered bodies of Examples 12A and 12B have the same composition, the same porosity and the same thermal conductivity. Based on a comparison of Examples 12A and 12B with Example 8A, and based on other work, it is known that the sintered bodies of Examples 12A and 12B have a thermal conductivity greater than 1.50 W/cm·K at 25° C., i.e. approximately greater than 1.72 W/cm·K at 25° C.

In Examples 13A and 13B too much free carbon was added to the powder mixture which caused too much deoxidation of the aluminum nitride producing sintered bodies with a composition outside polygon P1N1KJ below line N1P1 in FIG. 4 which is a composition area difficult to sinter as illustrated by the resulting high porosity of these sintered bodies.

The composition of the sintered bodies of Examples 14A and B is within experimental error of lying within polygon P1N1KJ. Based on other work and a comparison of Examples 14A and B with Examples 8A and 9A, it is known that the sintered bodies of Examples 14A and B would have a thermal conductivity greater than 1.00 W/cm·K at 25° C.

The equivalent % composition of the sintered bodies of Examples 15-20 fell outside polygon P1N1KJ of FIG. 4 and specifically they fell below line N1P1 of FIG. 4. The sintered bodies of Examples 15-20 had a porosity higher than 10% by volume of the body which illustrates the difficulty of sintering in this composition area below line N1P1 of FIG. 4.

Example 21 illustrates the present invention. The sintered body of Example 21 does not differ significantly in composition and porosity from the sintered body of Example 6. Also, based on a comparison of Example 21 with Example 8A, and based on other work, it is known that the sintered body of Example 21 has a thermal conductivity greater than 1.50 W/cm·K at 25° C., i.e. approximately 1.72 W/cm·K at 25° C.

Table III shows additional examples. Specifically, Table III shows the composition of the powder mixture, i.e. powders added, in each example as well as the specific surface area of some of the powders added.

The examples in Table III were carried out in substantially the same manner as disclosed for Example 6 or as disclosed for Example 8A and B except as shown in Table III or as noted herein.

TABLE III

| Ex. | Sample | Powders Added (wt %) | | | Heat Treatment | | | | |
|-----|--------|------|------|---|--------------|---|-------|---|------------|
|     |        | AlN  | $Y_2O_3$ | C | Deoxidation | | + Sintering | | |
|     |        |      |      |   | Temp °C. | Time Hr | Temp °C. | Time Hr | Atmosphere |
| 22 | 163A | 89.72–(0.5)* | 9.65–(2.8)* | 0.63 | 1600 | 1 | + 1900 | 1 | $N_2$ |
| 23 | 166A | 89.75–(0.5)* | 9.65–(0.7)* | 0.60 | 1600 | 1 | + 1900 | 1 | $N_2$ |
| 24 | 168A | 89.74–(0.5)* | 9.68** | 0.57 | 1600 | 1 | + 1900 | 1 | $N_2$ |
| 25 | 169A | 89.72–(0.5)* | 9.68–(0.6)* | 0.60*** | 1600 | 1 | + 1900 | 1 | $N_2$ |
| 26 | 170A | 88.83–(0.5)* | 9.60–(0.6)* | 1.57*** | 1600 | 1 | + 1960 | 1 | $N_2$ |
| 27 | 170B | " | " | " | 1600 | 1 | + 2000 | 1 | $N_2$ |
| 28 | 162A | 89.62–(1.6)* | 9.65** | 0.73 | 1600 | 1 | + 1900 | 1 | $N_2$ |
| 29 | 174A | 88.52–(1.2)* | 9.57–(0.6)* | 1.91*** | 1600 | 1 | + 2000 | 1 | $N_2$ |
| 30A | 131D | 89.42 | 9.39 | 1.19 | 1500 | ½ | + 1900 | 1 | $H_2$ + 25v/o$N_2$ |
|     |       |       |      |      | 1600 | 1 |       |   |         |
| 30B | 131D1 | " | " | " | " | " | " | " | " |
| 31 | 175A | 97.19–(0.5)* | 1.71–(0.6)* | 1.10*** | 1600 | 1 | + 1900 | 1 | $N_2$ |
| 32 | 175B | " | " | " | 1600 | 1 | + 2000 | 1 | $N_2$ |

| Ex. | Properties of Sintered Body | | | | | | | | | | |
|-----|------|------|------|------|------|------|------|------|------|------|---|
|     | Measured | | Equivalent % | | Wt Loss % | Density (g/cc) | Approximate Porosity (%) | % Second Phases | | | Thermal Conductivity W/cm·K @ 25° C. | Size |
|     | Oxygen (wt %) | Carbon (wt %) | Oxygen | Yttrium | | | | YN | $Y_2O_3$ | $Y_4Al_2O_9$ | | |
| 22 | — | — | ~5.6 | 3.78 | — | 3.32 | 2 | — | 2.7 | 5.2 | 1.40 | C |
| 23 | — | — | ~5.9 | 3.78 | — | 3.38 | <1 | — | 2.2 | 7.4 | 1.42 | C |
| 24 | — | — | ~5.6 | 3.79 | — | 3.09 | 9 | — | 2.6 | 4.5 | 1.29 | C |
| 25 | — | — | ~6.0 | 3.80 | — | 3.37 | <1 | — | 2.0 | 6.9 | 1.41 | C |
| 26 | — | — | ~4.9 | 3.80 | — | ~2.4 | ~28 | — | — | — | — | C |
| 27 | — | — | ~4.9 | 3.80 | — | 3.18 | 6 | — | 4.6 | 3.2 | — | C |
| 28 | — | — | ~5.5 | 3.79 | — | 3.30 | 2 | — | 2.6 | 4.1 | — | C |
| 29 | — | — | ~3.8 | 3.80 | — | 3.33 | 1 | ~0.7 | 5.6 | ~1.3 | — | C |
| 30A | — | — | ~6.0 | 3.70 | — | 3.35 | 1 | — | — | — | 1.52 | C |
| 30B | — | 0.014 | ~6.0 | 3.70 | 2.8 | — | — | — | 1.2 | 5.8 | — | A |
| 31 | — | — | ~1.3 | 0.64 | — | 2.54 | 23 | — | — | 1.3 | — | C |
| 32 | — | — | ~1.3 | 0.64 | — | 2.56 | 22 | — | — | — | — | C |

*Specific surface area of added powder in $m^2$/g is given in parenthesis
**$Y_2(CO_3)_3.3H_2O$ added as source of $Y_2O_3$
***Specific surface area of C = 25 $m^2$/g Example 29 of Table III illustrates the present invention. Based on other work and especially a comparison of Examples 29 and 30A, it is known that the sintered body of Example 29 would have a thermal conductivity greater than 1.00 W/cm·K at 25° C. The sintered body produced in Example 29 would be useful for packaging of integrated circuits as well as for use as substrates for semiconductors such as a silicon chip.

In each of the examples of Table III, except Example 29, insufficient carbon was added to the powder mixture thereby resulting in a deoxidized compact and a sintered body having a composition outside the polygon P1N1KJ of FIG. 4. However, Examples 22-25 illustrate the operability of relatively coarse powders for these compositions to produce sintered bodies having a porosity of less than 10% by volume. Examples 26 and 27 illustrate that for this composition and powders of relatively coarse particle size, increasing the sintering temperature significantly decreased the porosity of the resulting sintered body. Example 28 illustrates the use of yttrium carbonate as a precursor for yttrium oxide to produce a sintered body with low porosity. Examples 30A and B illustrate the operability of an atmosphere comprised of a mixture of hydrogen and 25% by volume nitrogen. Examples 31 and 32 illustrate that for this composition and particle size combination, sintering could not be effected to produce a sintered body having a porosity of less than about 10% by volume.

In U.S. Pat. Nos. 4,478,785 and 4,533,645 entitled HIGH THERMAL CONDUCTIVITY ALUMINUM NITRIDE CERAMIC BODY, and incorporated herein by reference, there is disclosed the process comprising forming a mixture comprised of aluminum nitride powder and free carbon wherein the aluminum nitride has a predetermined oxygen content higher than about 0.8% by weight and wherein the amount of free carbon reacts with such oxygen content to produce a deoxidized powder or compact having an oxygen content ranging from greater than about 0.35% by weight to about 1.1% by weight and which is at least 20% by weight lower than the predetermined oxygen content, heating the mixture or a compact thereof to react the carbon and oxygen producing the deoxidized aluminum nitride, and sintering a compact of the deoxidized aluminum nitride producing a ceramic body having a density greater than 85% of theoretical and a thermal conductivity greater than 0.5 W/cm·K at 22° C.

In copending U.S. patent application Ser. No. 656,636, entitled HIGH THERMAL CONDUCTIVITY CERAMIC BODY, filed on Oct. 1, 1984, in the names of Irvin Charles Huseby and Carl Francis Bobik and assigned to the assignee hereof and incorporated herein by reference, there is disclosed the process for producing an aluminum nitride ceramic body having a composition defined and encompassed by polygon JKLM but not including line MJ of FIG. 4 of Ser. No. 656,636 and a thermal conductivity greater than 1.42 W/cm·K at 25° C. which comprises forming a mixture comprised of aluminum nitride powder containing oxygen, yttrium oxide, and free carbon, shaping said mixture into a compact, said mixture and said compact having a composition wherein the equivalent % of yttrium and aluminum ranges from point L to less than point J of FIG. 4 of Ser. No. 656,636, said compact having an equivalent % composition of Y, Al, O and N outside the composition defined and encompassed by polygon JKLM of FIG. 4 of Ser. No. 656,636, the aluminum nitride in said compact containing oxygen in an amount ranging from greater than about 1.4% by weight to less than about 4.5% by weight of the aluminum nitride, heating said compact up to a temperature at which its pores remain open reacting said free carbon with oxygen contained in said aluminum nitride producing a deoxidized compact, said deoxidized compact having a composition wherein the equivalent % of Al, Y, O and N is defined and encompassed by polygon JKLM but not including line MJ of FIG. 4 of Ser. No. 656,636, and sintering said deoxidized compact at a temperature ranging from about 1890° C. to about 2050° C. producing said ceramic body.

In copending U.S. patent application Ser. No. 667,516 entitled HIGH THERMAL CONDUCTIVITY CERAMIC BODY, filed Nov. 1, 1984, in the names of Irvin Charles Huseby and Carl Francis Bobik and assigned to the assignee hereof and incorporated herein by reference, there is disclosed the process for producing an aluminum nitride ceramic body having a composition defined and encompassed by polygon FJDSR but not including line RF of FIG. 4 of Ser. No. 667,516, a porosity of less than about 4% by volume, and a thermal conductivity greater than 1.25 W/cm·K at 25° C. which comprises forming a mixture comprised of aluminum nitride powder containing oxygen, yttrium oxide, and free carbon, shaping said mixture into a compact, said mixture and said compact having a composition wherein the equivalent % of yttrium and aluminum ranges from point D up to point F of FIG. 4 of Ser. No. 667,516, said compact having an equivalent % composition of Y, Al, O and N outside the composition defined and encompassed by polygon FJDSR of FIG. 4 of Ser. No. 667,516, the aluminum nitride in said compact containing oxygen in an amount ranging from greater than about 1.95% by weight to less than about 5.1% by weight of the aluminum nitride, heating said compact up to a temperature at which its pores remain open reacting said free carbon with oxygen contained in said aluminum nitride producing a deoxidized compact, said deoxidized compact having a composition wherein the equivalent % of Al, Y, O and N is defined and encompassed by polygon FJDSR but not including line RF of FIG. 4 of Ser. No. 667,516, and sintering said deoxidized compact at a temperature ranging from about 1870° C. to about 2050° C. producing said ceramic body.

In copending U.S. patent application Ser. No. 675,048 entitled HIGH THERMAL CONDUCTIVITY CERAMIC BODY filed Nov. 26, 1984, in the names of Irvin Charles Huseby and Carl Francis Bobik and assigned to the assignee hereof and incorporated herein by reference, there is disclosed the process for producing an aluminum nitride ceramic body having a composition defined and encompassed by polygon PONKJ but not including lines KJ and PJ of FIG. 4 of Ser. No. 675,048, a porosity of less than about 4% by volume, and a minimum thermal conductivity of 1.50 W/cm·K at 25° C. which comprises forming a mixture comprised of aluminum nitride powder containing oxygen, yttrium oxide, and free carbon, shaping said mixture into a compact, said mixture and said compact having a composition wherein the equivalent % of yttrium and aluminum ranges between points K and P of FIG. 4 of Ser. No. 675,048, said compact having an equivalent % composition of Y, Al, O and N outside the composition defined and encompassed by polygon PONKJ of FIG. 4 of Ser. No. 675,048, the aluminum nitride in said compact containing oxygen in an amount ranging from greater than about 1.40% by weight to less than about 4.50% by weight of the aluminum nitride, heating said compact up to a temperature at which its pores remain open reacting said free carbon with oxygen contained in said aluminum nitride producing a deoxidized compact, said deoxidized compact having a composition wherein the equivalent % of Al, Y, O and N is defined and encompassed by polygon PONKJ but not including lines KJ and PJ of FIG. 4 of Ser. No. 675,048 and sintering said deoxidized compact at a temperature ranging from about 1900° C. to about 2050° C. producing said ceramic body, said sintering temperature being a sintering temperature for said composition of said deoxidized compact.

In copending U.S. patent application Ser. No. 679,414 entitled HIGH THERMAL CONDUCTIVITY CERAMIC BODY filed Dec. 7, 1984, in the names of Irvin Charles Huseby and Carl Francis Bobik and assigned to the same assignee hereof and incorporated herein by reference, there is disclosed the process for producing an aluminum nitride ceramic body having a composition defined and encompassed by polygon PJFAl but not including lines JF and AlF of FIG. 4 of Ser. No. 679,414, a porosity of less than about 4% by volume, and a minimum thermal conductivity of 1.42 W/cm·K at 25° C. which comprises forming a mixture comprised of aluminum nitride powder containing oxygen, yttrium oxide, and free carbon, shaping said mixture into a compact, said mixture and said compact having a composition wherein the equivalent % of yttrium and aluminum ranges between points J and A1 of FIG. 4 of Ser. No. 679,414, said compact having an equivalent % composition of Y, Al, O and N outside the composition defined and encompassed by polygon PJFA1 of FIG. 4 of Ser. No. 679,414, the aluminum nitride in said compact containing oxygen in an amount ranging from greater than about 1.42% by weight to less than about 4.70% by weight of the aluminum nitride, heating said compact up to a temperature at which its pores remain open reacting said free carbon with oxygen contained in said aluminum nitride producing a deoxidized compact, said deoxidized compact having a composition wherein the equivalent % of Al, Y, O and N is defined and encompassed by polygon PJFA1 but not including lines JF and A1F of FIG. 4 of Ser. No. 679,414, and sintering said deoxidized compact at a temperature ranging from about 1880° C. to about 2050° C. wherein the minimum sintering temperature increases from about 1880° C. for a composition defined and encompassed by polygon A3JFA2 excluding lines A3J, JF and A2F to about 1925° C. for a composition at point P of FIG. 4 of Ser. No. 679,414, producing said ceramic body, said sintering temperature being a sintering temperature for said composition of said deoxidized compact.

In copending U.S. patent application Ser. No. 682,468, entitled HIGH THERMAL CONDUCTIVITY CERAMIC BODY, filed on Dec. 17, 1984, in the names of Irvin Charles Huseby and Carl Francis Bobik and assigned to the assignee herein and incorporated herein by reference, there is disclosed a process for producing an aluminum nitride ceramic body having a composition defined and encompassed by polygon LT1DM but not including lines LM and DM of FIG. 4 of Ser. No. 682,468, a porosity of less than about 4% by volume, and a minimum thermal conductivity of 1.27 W/cm·K at 25° C. which comprises forming a mixture comprised of aluminum nitride powder containing oxygen, yttrium oxide, and free carbon, shaping said mixture into a compact, said mixture and said compact having a composition wherein the equivalent % of yttrium and aluminum ranges from point T1 up to point M of FIG. 4 of Ser. No. 682,468, said compact having an equivalent % composition of Y, Al, O and N outside the composition defined and encompassed by polygon LT1DM of FIG. 4 of Ser. No. 682,468, the aluminum nitride in said compact containing oxygen in an amount ranging from greater than about 1.85% by weight to less than about 4.50% by weight of the aluminum nitride, heating said compact up to a temperature at which its pores remain open reacting said free carbon with oxygen contained in said aluminum nitride producing a deoxidized compact, said deoxidized compact having a composition wherein the equivalent % of Al, Y, O and N is defined and encompassed by polygon LT1DM but not including lines LM and DM of FIG. 4 of Ser. No. 862,468, and sintering said deoxidized compact at a temperature ranging from about 1890° C. to about 2050° C. wherein the minimum sintering temperature increases from about 1890° C. for a composition adjacent to line DM to about 1970° C. for a composition on line T1L producing said ceramic body, said sintering temperature being a sintering temperature for said composition of said deoxidized compact.

What is claimed is:

1. A process for producing a sintered polycrystalline aluminum nitride ceramic body having a composition defined and encompassed by polygon P1N1KJ but not including lines KJ and P1J of FIG. 4, a porosity of less than about 10% by volume of said body and a thermal conductivity greater than 1.00 W/cm·K at 25° C. which comprises the steps:

(a) forming a mixture comprised of an oxygen-containing aluminum nitride powder, yttrium oxide, and free carbon, shaping said mixture into a compact, said mixture and said compact having a composition wherein the equivalent % of yttrium and aluminum ranges between points K and P1 of FIG. 4, said yttrium ranging from greater than about 0.35 equivalent % to less than about 4.4 equivalent %, said aluminum ranging from greater than about 95.6 equivalent % to less than about 99.65 equivalent %, said mixture and said compact having an equivalent % composition of Y, Al, O and N outside the composition defined and encompassed by polygon P1N1KJ of FIG. 4, (b) heating said compact in a nitrogen-containing nonoxidizing atmosphere at a temperature ranging from about 1350° C. to a temperature sufficient to deoxidize the compact but below its pore closing temperature reacting said free carbon with oxygen contained in said aluminum nitride producing a deoxidized compact, said deoxidized compact having a composition wherein the equivalent % of Al, Y, O and N is defined and encompassed by polygon P1N1KJ but not including lines KJ and P1J of FIG. 4, said free carbon being in an amount which produces said deoxidized compact, and (c) sintering said deoxidized compact in a nitrogen-containing nonoxidizing atmosphere at a temperature of at least about 1860° C. producing said polycrystalline body.

2. The process according to claim 1 wherein said nitrogen-containing atmosphere in step (b) contains sufficient nitrogen to facilitate deoxidation of the aluminum nitride to produce said sintered body.

3. The process according to claim 1 wherein said nitrogen-containing atmosphere in step (c) contains sufficient nitrogen to prevent significant weight loss of said aluminum nitride.

4. The process according to claim 1 wherein said process is carried out at ambient pressure.

5. The process according to claim 1 wherein the aluminum nitride in said compact in step (a) before said deoxidation of step (b) contains oxygen in an amount ranging from greater than about 0.6% by weight to less than about 4.5% by weight of said aluminum nitride.

6. The process according to claim 1 wherein said aluminum nitride in step (a) has a specific surface area ranging up to about 10 m$^2$/g and said free carbon has a specific surface area greater than about 10 m$^2$/g.

7. The process according to claim 1 wherein said mixture and said compact have a composition wherein the equivalent % of yttrium and aluminum ranges between points K and P of FIG. 4, said yttrium ranging from greater than about 0.55 equivalent % to less than about 4.4 equivalent %, said aluminum ranging from greater than about 95.6 equivalent % to less than about 99.45 equivalent %, and wherein said sintered body and said deoxidized compact are comprised of a composition wherein the equivalent percent of Al, Y, O and N is defined and encompassed by polygon PONKJ but not including lines KJ and PJ of FIG. 4.

8. The process according to claim 1 wherein said mixture and said compact have a composition wherein the equivalent % of yttrium and aluminum ranges from point N up to point P1 of FIG. 4, said yttrium ranging from greater about 0.35 equivalent % to about 2.9 equivalent %, said aluminum ranging from about 97.1 equivalent % to less than about 99.65 equivalent %, and wherein said sintered body and said deoxidized compact are comprised of a composition wherein the equivalent percent of Al, Y, O and N is defined and encompassed by polygon P1N1NOP but not including line P1P of FIG. 4, and said sintering temperature is at least about 1900° C.

9. The process according to claim 1 wherein said free carbon has a specific surface area greater than about 100 m²/g, said aluminum nitride powder in said mixture has a specific surface area ranging from about 3.4 m²/g to about 6.0 m²/g, wherein said mixture and said compact have a composition wherein the equivalent % of yttrium and aluminum ranges between points K and P of FIG. 4, said yttrium ranging from greater than about 0.55 equivalent % to less than about 4.4 equivalent %, said aluminum ranging from greater than about 95.6 equivalent % to less than about 99.45 equivalent %, said sintering atmosphere is nitrogen, said sintering temperature is from about 1965° C. to about 2050° C., said sintered body and said deoxidized compact are comprised of a composition wherein the equivalent percent of Al, Y, O and N is defined and encompassed by polygon PONKJ but does not include lines NK, KJ and PJ of FIG. 4, and said sintered body has a porosity of less than about 2% by volume of said body and has a thermal conductivity greater than 1.67 W/cm·K at 25° C.

10. The process according to claim 1 wherein said mixture and said compact have a composition wherein the equivalent % of yttrium and aluminum ranges from point N1 up to point K of FIG. 4, said yttrium ranging from about 1.9 equivalent % to less than about 4.4 equivalent %, said aluminum ranging from greater than about 95.6 equivalent % to about 98.1 equivalent %, and wherein said sintered body and said deoxidized compact are comprised of a composition wherein the equivalent percent of Al, Y, O and N is defined by line N1K but not including point K of FIG. 4, and said sintering temperature is at least about 1960° C.

11. A process for producing a sintered polycrystalline aluminum nitride ceramic body having a composition defined and encompassed by polygon QTXJ but not including lines QJ and XJ of FIG. 4, a porosity of less than about 10% by volume of said body and a thermal conductivity greater than 1.50 W/cm·K at 25° C. which comprises the steps:

(a) forming a mixture comprised of an oxygen-containing aluminum nitride powder, yttrium oxide, and free carbon, said free carbon having a specific surface area greater than about 100 m²/g, the aluminum nitride powder in said mixture having a specific surface area ranging from about 3.4 m²/g to about 6.0 m²/g, shaping said mixture into a compact, said mixture and said compact having a composition wherein the equivalent % of yttrium and aluminum ranges from less than point X up to point Q of FIG. 4, said yttrium in said compact ranging from greater than about 0.8 equivalent % to less than about 3.2 equivalent %, said aluminum in said compact ranging from greater than about 96.8 equivalent % to less than about 99.2 equivalent %, said compact having an equivalent % composition of Y, Al, O and N outside the composition defined and encompassed by polygon P1N1KJ of FIG. 4, the aluminum nitride in said compact containing oxygen in an amount ranging from greater than about 1.40% by weight to less than about 4.50% by weight of said aluminum nitride, (b) heating said compact at ambient pressure in a nitrogen-containing nonoxidizing atmosphere containing at least about 25% by volume of nitrogen at a temperature ranging from about 1350° C. to a temperature sufficient to deoxidize the compact but below its pore closing temperature thereby reacting said free carbon with oxygen contained in said aluminum nitride producing a deoxidized compact, said deoxidized compact having a composition wherein the equivalent % of Al, Y, O and N is defined and encompassed by polygon QTXJ but not including lines QJ and XJ of FIG. 4, the aluminum nitride in said compact before said deoxidation by said carbon having an oxygen content ranging from greater than about 1.40% by weight to less than about 4.50% by weight of said aluminum nitride, said free carbon being in an amount which produces said deoxidized compact, and (c) sintering said deoxidized compact at ambient pressure in a nitrogen-containing nonoxidizing atmosphere containing at least about 25% by volume nitrogen at a temperature ranging from about 1910° C. to about 2000° C. producing said polycrystalline body.

12. The process according to claim 11 wherein the sintering temperature ranges from about 1910° C. to about 1950° C., said aluminum nitride powder in said mixture has a specific surface area ranging from about 3.7 m²/g to about 6.0 m²/g, and said sintered body has a porosity of less than about 1% by volume of said body.

13. The process according to claim 11 wherein the sintering temperature ranges from about 1950° C. to about 2000° C., and said sintered body has a porosity of less than about 1% by volume of said body and a thermal conductivity greater than about 1.67 W/cm·K at 25° C.

14. A process for producing a sintered polycrystalline aluminum nitride ceramic body having a composition defined and encompassed by polygon P1N1KJ but not including lines KJ and P1J of FIG. 4, a porosity of less than about 10% by volume of said body and a thermal conductivity greater than 1.00 W/cm·K at 25° C. which comprises the steps:

(a) forming a mixture comprised of aluminum nitride powder, yttrium oxide or precursor therefor, and a carbonaceous additive selected from the group consisting of free carbon, a carbonaceous organic material and mixtures thereof, said carbonaceous organic material thermally decomposing at a temperature ranging from about 50° C. to about 1000° C. to free carbon and gaseous product of decomposition which vaporizes away, shaping said mixture into a compact, said mixture and said compact having a composition wherein the equivalent % of yttrium and aluminum ranges between points K and P1 of FIG. 4, said yttrium ranging from greater than about 0.35 equivalent % to less than about 4.4 equivalent %, said aluminum ranging from greater than about 95.6 equivalent % to less than about 99.65 equivalent % aluminum, said compact having an equivalent % composition of Y, Al, O and N outside the composition defined and encompassed by polygon P1N1KJ of FIG. 4, (b) heating said compact in a nonoxidizing atmosphere at a temperature up to about 1200° C. thereby providing yttrium oxide and free carbon, (c) heating said compact in a nitrogen-containing nonoxidizing atmosphere at a temperature ranging from about 1350° C. to a temperature sufficient to deoxidize the compact but below its pore closing temperature reacting said free carbon with oxygen contained in said aluminum nitride producing a deoxidized compact, said deoxidized compact having a composition wherein the equivalent % of Al, Y, O and N is defined and encompassed by polygon P1N1KJ but not including lines KJ and P1J of FIG. 4, said free carbon being in an amount which produces said deoxidized compact, and (d) sintering said deoxidized compact in a nitrogen-containing nonoxidizing atmosphere of at least about 1860° C. producing said polycrystalline body.

15. The process according to claim 14 wherein said nitrogen-containing atmosphere in step (c) contains sufficient nitrogen to facilitate deoxidation of the aluminum nitride to produce said sintered body.

16. The process according to claim 14 wherein said nitrogen-containing atmosphere in step (d) contains sufficient nitrogen to prevent significant weight loss of said aluminum nitride.

17. The process according to claim 14 wherein said process is carried out at ambient pressure.

18. The process according to claim 14 wherein the aluminum nitride in said compact in step (a) before said deoxidation of step (c) contains oxygen in an amount ranging from greater than about 0.6% by weight to less than about 4.5% by weight of said aluminum nitride.

19. The process according to claim 14 wherein said aluminum nitride in step (a) has a specific surface area ranging up to about 10 m$^2$/g and said free carbon has a specific surface area greater than about 10 m$^2$/g.

20. The process according to claim 14 wherein said mixture and said compact have a composition wherein the equivalent % of yttrium and aluminum ranges between points K and P of FIG. 4, said yttrium ranging from greater than about 0.55 equivalent % to less than about 4.4 equivalent %, said aluminum ranging from greater than about 95.6 equivalent % to less than about 99.45 equivalent %, and wherein said sintered body and said deoxidized compact are comprised of a composition wherein the equivalent percent of Al, Y, O and N is defined and encompassed by polygon PONKJ but not including lines KJ and PJ of FIG. 4.

21. The process according to claim 14 wherein said mixture and said compact have a composition wherein the equivalent % of yttrium and aluminum ranges from point N up to point P1 of FIG. 4, said yttrium ranging from greater than about 0.35 equivalent % to about 2.9 equivalent %, said aluminum ranging from about 97.1 equivalent % to less than about 99.65 equivalent %, and wherein said sintered body and said deoxidized compact are comprised of a composition wherein the equivalent percent of Al, Y, O and N is defined and encompassed by polygon P1N1NOP but not including line P1P of FIG. 4, and said sintering temperature is at least about 1900° C.

22. The process according to claim 14 wherein said free carbon has a specific surface area greater than about 100 m$^2$/g, said aluminum nitride powder in said mixture has a specific surface area ranging from about 3.4 m$^2$/g to about 6.0 m$^2$/g, wherein said mixture and said compact have a composition wherein the equivalent % of yttrium and aluminum ranges between points K and P of FIG. 4, said yttrium ranging from greater than about 0.55 equivalent % to less than about 4.4 equivalent %, said aluminum ranging from greater than about 95.6 equivalent % to less than about 99.45 equivalent %, said sintering atmosphere is nitrogen, said sintering temperature is from about 1965° C. to about 2050° C., said sintered body and said deoxidized compact are comprised of a composition wherein the equivalent percent of Al, Y, O and N is defined and encompassed by polygon PONKJ but does not include lines NK, KJ and PJ of FIG. 4, and said sintered body has a porosity of less than about 2% by volume of said body and has a thermal conductivity greater than 1.67 W/cm·K at 25° C.

23. The process according to claim 14 wherein said mixture and said compact have a composition wherein the equivalent % of yttrium and aluminum ranges from point N1 up to point K of FIG. 4, said yttrium ranging from about 1.9 equivalent % to less than about 4.4 equivalent %, said aluminum ranging from greater than about 95.6 equivalent % to about 98.1 equivalent %, and wherein said sintered body and said deoxidized compact are comprised of a composition wherein the equivalent percent of Al, Y, O and N is defined by line N1K but not including point K of FIG. 4, and said sintering temperature is at least about 1960° C.

24. A process for producing a sintered polycrystalline aluminum nitride ceramic body having a composition defined and encompassed by polygon QTXJ but not including lines QJ and XJ of FIG. 4, a porosity of less than about 10% by volume of said body and a thermal conductivity greater than 1.50 W/cm·K at 25° C. which comprises the steps:

(a) forming a mixture comprised of an oxygen-containing aluminum nitride powder, yttrium oxide or precursor therefor, and a carbonaceous additive selected from the group consisting of free carbon, a carbonaceous organic material and mixtures thereof, said carbonaceous organic material thermally decomposing at a temperature ranging from about 50° C. to about 1000° C. to free carbon and gaseous product of decomposition which vaporizes away, said free carbon having a specific surface area greater than about 100 m$^2$/g, the aluminum nitride powder in said mixture having a specific surface area ranging from about 3.4 m$^2$/g to about 6.0 m$^2$/g, shaping said mixture into a compact, said mixture and said compact having a composition wherein the equivalent % of yttrium and aluminum ranges from less than point X up to point Q of FIG. 4, said yttrium ranging from greater than about 0.8 equivalent % to less than about 3.2 equivalent %, said aluminum ranging from greater than about 96.8% equivalent % to less than about 99.2 equivalent %, said compact having an equivalent % composition of Y, Al, O and N outside the composition defined and encompassed by polygon P1N1KJ of FIG. 4, the aluminum nitride in said compact containing oxygen in an amount ranging from greater than about 1.40% by weight to less than about 4.50% by weight of said aluminum nitride, (b) heating said compact in a nonoxidizing atmosphere at a temperature up to about 1200° C. thereby providing yttrium oxide and free carbon, (c) heating said compact at ambient pressure in a nitrogen-containing nonoxidizing atmosphere containing at least about 25% by volume nitrogen at a temperature ranging from about 1350° C. to a temperature sufficient to deoxidize the compact but below its pore closing temperature thereby reacting said free carbon with oxygen contained in said aluminum nitride producing a deoxidized compact, said deoxidized compact having a composition wherein the equivalent % of Al, Y, O and N is defined and encompassed by polygon QTXJ but not including lines QJ and XJ of FIG. 4, the aluminum nitride in said compact before said deoxidation by said carbon having an oxygen content ranging from greater than about 1.40% by weight to less than about 4.50% by weight of said aluminum nitride, said free carbon being in an amount which produces said deoxidized compact, and (d) sintering said deoxidized compact at ambient pressure in a nitrogen-containing nonoxidizing atmosphere containing at least about 25% by volume nitrogen at a temperature ranging from about 1910° C. to about 2000° C. producing said polycrystalline body.

25. The process according to claim 24 wherein the sintering temperature ranges from about 1910° C. to about 1950° C., said aluminum nitride powder in said mixture has a specific surface area ranging from about 3.7 m$^2$/g to about 6.0 m$^2$/g, and said sintered body has a porosity of less than about 1% by volume of said body.

26. The process according to claim 24 wherein the sintering temperature ranges from about 1950° C. to about 2000° C., and said sintered body has a porosity of less than about 1% by volume of said body and a thermal conductivity greater than about 1.67 W/cm·K at 25° C.

27. A polycrystalline aluminum nitride body having a composition defined and encompassed by polygon P1N1KJ but not including lines KJ and P1J of FIG. 4, a porosity of less than about 10% by volume of said body and a thermal conductivity greater than 1.00 W/cm·K at 25° C.

28. A polycrystalline aluminum nitride body having a composition defined and encompassed by polygon P1N1NOP but not including line P1P of FIG. 4, a porosity of less than about 10% by volume of said body and a thermal conductivity greater than 1.00 W/cm·K at 25° C.

29. A polycrystalline aluminum nitride body having a composition defined and encompassed by polygon PONKJ but not including lines KJ and PJ of FIG. 4, a porosity of less than about 10% by volume of said body and a thermal conductivity greater than 1.00 W/cm·K at 25° C.

30. A polycrystalline aluminum nitride body having a composition defined and encompassed by polygon QTXJ but not including lines QJ and XJ of FIG. 4, a porosity of less than about 10% by volume of said body and a thermal conductivity greater than 1.00 W/cm·K at 25° C.

31. A polycrystalline body having a composition defined and encompassed by polygon P1N1KJ of FIG. 4 but excluding lines KJ and P1J which is comprised of from greater than about 0.35 equivalent % yttrium to less than about 4.4 equivalent % yttrium, from greater than about 95.6 equivalent % aluminum to less than about 99.65 equivalent % aluminum, from greater than about 0.85 equivalent % oxygen to less than about 4.4 equivalent % oxygen and from greater than about 95.6 equivalent % nitrogen to less than about 99.15 equivalent % nitrogen, said polycrystalline body having a porosity of less than about 10% by volume of said body and a thermal conductivity greater than 1.00 W/cm·K at 25° C.

32. A polycrystalline body having a composition defined and encompassed by polygon P1N1NOP of FIG. 4 but excluding line P1P which is comprised of from greater than about 0.35 equivalent % yttrium to about 2.9 equivalent % yttrium, from about 97.1 equivalent % aluminum to less than about 99.65 equivalent % aluminum, from greater than about 0.85 equivalent % oxygen to about 2.9 equivalent % oxygen and from about 97.1 equivalent % nitrogen to less than about 99.15 equivalent % nitrogen, said polycrystalline body having a porosity of less than about 10% by volume of said body and a minimum thermal conductivity greater than 1.00 W/cm·K at 25° C.

33. A polycrystalline body having a composition defined and encompassed by polygon PONKJ of FIG. 4 but excluding lines KJ and PJ which is comprised of from greater than about 0.55 equivalent % yttrium to less than about 4.4 equivalent % yttrium, from greater than about 95.6 equivalent % aluminum to less than about 99.45 equivalent % aluminum, from about 1.1 equivalent % oxygen to less than about 4.4 equivalent % oxygen and from greater than about 95.6 equivalent % nitrogen to about 98.9 equivalent % nitrogen, said polycrystalline body having a porosity of less than about 10% by volume of said body and a thermal conductivity greater than 1.00 W/cm·K at 25° C.

34. A polycrystalline body having a composition defined and encompassed by polygon QTXJ of FIG. 4 but excluding lines QJ and XJ which is comprised of from greater than about 0.8 equivalent % yttrium to less than about 3.2 equivalent % yttrium, from about 96.8 equivalent % aluminum up to about 99.2 equivalent % aluminum, from greater than about 1.55 equivalent % oxygen to less than about 4.2 equivalent % oxygen and from greater than about 95.8 equivalent % nitrogen to less than about 98.45 equivalent % nitrogen, said polycrystalline body having a porosity of less than about 10% by volume of said body and a thermal conductivity greater than 1.00 W/cm·K at 25° C.

35. A polycrystalline body having a composition defined and encompassed by polygon PONKJ but excluding lines NK, KJ and PJ of FIG. 4 which is comprised of from greater than about 0.55 equivalent % yttrium to less than about 4.4 equivalent % yttrium, from greater than about 95.6 equivalent % aluminum to less than about 99.45 equivalent % aluminum, from about 1.1 equivalent % oxygen to less than about 4.4 equivalent % oxygen and from greater than about 95.6 equivalent % nitrogen to about 98.9 equivalent % nitrogen, said polycrystalline body having a porosity of less than about 4% by volume of said body and a minimum thermal conductivity of 1.50 W/cm·K at 25° C.

36. A polycrystalline body having a composition defined by line N1K of FIG. 4 but excluding point K which is comprised of from about 1.9 equivalent % yttrium to less than about 4.4 equivalent % yttrium, from greater than about 95.6 equivalent % aluminum to about 98.1 equivalent % aluminum, from about 1.9 equivalent % oxygen to less than about 4.4 equivalent % oxygen and from greater than about 95.6 equivalent % nitrogen to about 98.1 equivalent % nitrogen, said polycrystalline body having a porosity of less than about 10% by volume of said body and a thermal conductivity greater than 1.00 W/cm·K at 25° C.

37. A polycrystalline body having a composition defined and encompassed by polygon QTY1Y2 but excluding line QY2 of FIG. 4 which is comprised of from greater than about 0.8 equivalent % yttrium to about 2.0 equivalent % yttrium, from about 98.0 equivalent % aluminum to less than about 99.2 equivalent % aluminum, from greater than about 1.55 equivalent % oxygen to less than about 3.15 equivalent % oxygen and from greater than about 96.85 equivalent % nitrogen to less than about 98.45 equivalent % nitrogen, said polycrystalline body having a porosity of less than about 2% by volume of said body and a thermal conductivity greater than 1.50 W/cm·K at 25° C.

38. A polycrystalline body having a phase composition comprised of AlN, $Y_2O_3$ and Y wherein the total amount of said $Y_2O_3$ and $Y_4Al_2O_9$ phases ranges from greater than about 0.8% by volume to less than about 7.6% by volume of the total volume of said body, said $Y_2O_3$ and $Y_4Al_2O_9$ phases being present in at least a trace amount, said $Y_2O_3$ phase ranging to less than about 7.6% by volume of said sintered body, said $Y_4Al_2O_9$ phase ranging to less than about 6.0% by volume of said sintered body, said body having a porosity of less than about 10% by volume of said body and a thermal conductivity greater than 1.00 W/cm·K at 25° C.

39. A polycrystalline body having a phase composition comprised of AlN, $Y_2O_3$, and $Y_4Al_2O_9$ wherein the total amount of said $Y_2O_3$ and Y phases ranges from greater than about 0.8% by volume to less than about 5.1% by volume of the total volume of said body, said $Y_2O_3$ and $Y_4Al_2O_9$ phases being present in at least a trace amount, said $Y_2O_3$ phase ranging to less than about 5.1% by volume of said sintered body, said $Y_4Al_2O_9$ phase ranging to less than about 1.3% by volume of said sintered body, said body having a porosity of less than about 10% by volume of said body and a minimum thermal conductivity of greater than 1.00 W/cm·K at 25° C.

40. A polycrystalline body having a phase composition comprised of AlN, $Y_2O_3$, and $Y_4Al_2O_9$ wherein the total amount of said $Y_2O_3$ and $Y_4Al_2O_9$ phases ranges from about 1.3% by volume to less than about 7.6% by volume of the total volume of said body, said $Y_2O_3$ and $Y_4Al_2O_9$ phases being present in at least a trace amount, said $Y_2O_3$ phase ranging to less than about 7.6% by volume of said sintered body, said $Y_4Al_2O_9$ phase ranging to less than about 6.0% by volume of said sintered body, said body having a porosity of less than about 10% by volume of said body and a thermal conductivity greater than 1.00 W/cm·K at 25° C.

41. The polycrystalline body according to claim 40 wherein said body has a porosity of less than about 2% by volume of said body and a thermal conductivity greater than 1.67 W/cm·K at 25° C.

42. A polycrystalline body having a phase composition comprised of AlN and $Y_2O_3$ wherein the total amount of said $Y_2O_3$ phase ranges from about 3.3% by volume to less than about 7.6% by volume of the total volume of said body, said body having a porosity of less than about 10% by volume of said body and a thermal conductivity greater than 1.00 W/cm·K at 25° C.

43. A polycrystalline body having a phase composition comprised of AlN, $Y_2O_3$ and $Y_4Al_2O_9$ wherein the total amount of said $Y_2O_3$ and $Y_4Al_2O_9$ phases ranges from greater than about 1.9% by volume to less than about 6.6% by volume of the total volume of said body, said $Y_2O_3$ phase ranging in amount from at least a trace amount to less than about 2.8% by volume of said body, said $Y_4Al_2O_9$ phase ranging from about 1.5% by volume to less than about 6.0% by volume of said body, said body having a porosity of less than about 2% by volume of said body and a thermal conductivity greater than 1.50 W/cm·K at 25° C.

44. The polycrystalline body according to claim 43 wherein said body has a porosity of less than about 1% by volume of said body and a thermal conductivity greater than 1.67 W/cm·K at 25° C.

45. A polycrystalline body having a phase composition comprised of AlN, $Y_2O_3$ and $Y_4Al_2O_9$ wherein the total amount of $Y_2O_3$ and $Y_4Al_2O_9$ phases ranges from greater than about 1.9% by volume to less than about 4.5% by volume of the total volume of said body, said $Y_2O_3$ phase ranging from a trace amount to about 1.5% by volume of the sintered body, said $Y_4Al_2O_9$ phase ranging from about 1.5% by volume to less than about 4.5% by volume of the sintered body, said body having a porosity of less than about 2% by volume of said body and a thermal conductivity greater than 1.50 W/cm·K at 25° C.

46. The polycrystalline body according to claim 45 wherein said body has a porosity of less than about 1% by volume of said body and a thermal conductivity greater than 1.68 W/cm·K at 25° C.

* * * * *